(12) United States Patent
Tanaka et al.

(10) Patent No.: US 11,212,178 B2
(45) Date of Patent: Dec. 28, 2021

(54) CONTROL SYSTEM, ELECTRONIC DEVICE, AND CONTROL METHOD

(71) Applicant: TOSHIBA CLIENT SOLUTIONS CO., LTD., Tokyo (JP)

(72) Inventors: Kenji Tanaka, Hachioji Tokyo (JP); Yoshio Matsuoka, Ome Tokyo (JP)

(73) Assignee: TOSHIBA CLIENT SOLUTIONS CO., LTD., Tokyo (JP)

( * ) Notice: Subject to any disclaimer, the term of this patent is extended or adjusted under 35 U.S.C. 154(b) by 111 days.

(21) Appl. No.: 16/221,336

(22) Filed: Dec. 14, 2018

(65) Prior Publication Data
US 2019/0372845 A1 Dec. 5, 2019

(30) Foreign Application Priority Data

Jun. 5, 2018 (JP) .............................. JP2018-107868
Jul. 31, 2018 (JP) .............................. JP2018-143730

(51) Int. Cl.
*H04L 12/24* (2006.01)
*G06F 9/06* (2006.01)

(52) U.S. Cl.
CPC ............ *H04L 41/0853* (2013.01); *G06F 9/06* (2013.01)

(58) Field of Classification Search
CPC ............ H04L 41/0869; H04L 41/0853; H04L 41/082; H04L 41/0859; H04L 67/303
See application file for complete search history.

(56) References Cited

U.S. PATENT DOCUMENTS

| 9,184,996 | B2 | 11/2015 | Kagitani | |
| 2013/0238687 | A1* | 9/2013 | Yamashita | G06F 9/4416 709/203 |
| 2013/0246596 | A1* | 9/2013 | Fujiwara | H04L 41/08 709/223 |
| 2016/0054960 | A1* | 2/2016 | Ito | G06F 3/1205 358/1.15 |
| 2017/0195178 | A1* | 7/2017 | Kaluza | H04L 41/0853 |
| 2018/0225105 | A1* | 8/2018 | Kaushik | G06F 8/65 |
| 2019/0095195 | A1* | 3/2019 | Lin | G06F 9/4406 |

FOREIGN PATENT DOCUMENTS

| JP | 2001-325171 | A | | 11/2001 |
| JP | 2007-299136 | A | | 11/2007 |
| JP | 2010-182260 | A | | 8/2010 |
| JP | 2012-068718 | A | | 4/2012 |
| WO | WO2000054149 | | * | 9/2000 |

* cited by examiner

*Primary Examiner* — Nam T Tran
(74) *Attorney, Agent, or Firm* — Knobbe, Martens, Olson & Bear LLP

(57) ABSTRACT

According to one embodiment, a control system includes a client terminal, a first server and a second server. The client terminal transmits an assignment request of an IP address including first identification information that uniquely identifies the client terminal and is set as a host name to the first server. The first server assigns an IP address to the client terminal in accordance with the request, and transmits the IP address and the host name to the second server. The second server transmits, when one or more items of second identification information include the first identification information set as the host name and when a setup process of the client terminal has not been performed, data for the process of the client terminal to the client terminal using the IP address.

16 Claims, 21 Drawing Sheets

| IP address | Host name | Lease date and time | Expiration date and time |
|---|---|---|---|
| 192.168.1.1 | client 1 | 2018/5/24 8:30 | 2018/5/24 11:30 |
| 192.168.1.2 | XXX003 (Encrypted) | 2018/5/24 9:30 | 2018/5/24 10:30 |
| ... | ... | ... | ... |

F I G. 3

| Production number | Computer name | State | Management server URL | VDI server URL | Client certificate | Common key | Information update date and time |
|---|---|---|---|---|---|---|---|
| XXX001 | client1 | Normal | http://xxx.xxx.xxx.xxx/OS/yyy | https://vdsite0000.com/Vdi/Website/ | authority001 | key001 | 2018/05/16 10:00 |
| XXX002 | client2 | Locked | http://xxx.xxx.xxx.xxx/OS/yyy | https://vdsite0000.com/Vdi/Website/ | authority002 | key002 | 2018/05/17 15:00 |
| XXX003 | | Pre-setup | | | | | |
| ⋮ | ⋮ | ⋮ | ⋮ | ⋮ | ⋮ | ⋮ | ⋮ |

F I G. 4

| Production number | Computer name | State | Management server URL | VDI server URL | Client certificate | Common key | Information update date and time |
|---|---|---|---|---|---|---|---|
| XXX001 | client1 | Normal | http://xxx.xxx.xxx.xxx/OS/yyy | https://vdsite0000.com/Vdi/Website/ | authority001 | key001 | 2018/05/16 10:00 |
| XXX002 | client2 | Locked | http://xxx.xxx.xxx.xxx/OS/yyy | https://vdsite0000.com/Vdi/Website/ | authority002 | key002 | 2018/05/17 15:00 |
| XXX003 | client3 | Normal | http://xxx.xxx.xxx.xxx/OS/yyy | https://vdsite0000.com/Vdi/Website/ | authority003 | key003 | 2018/05/18 9:00 |
| ... | ... | ... | ... | ... | ... | ... | ... |

F I G. 5

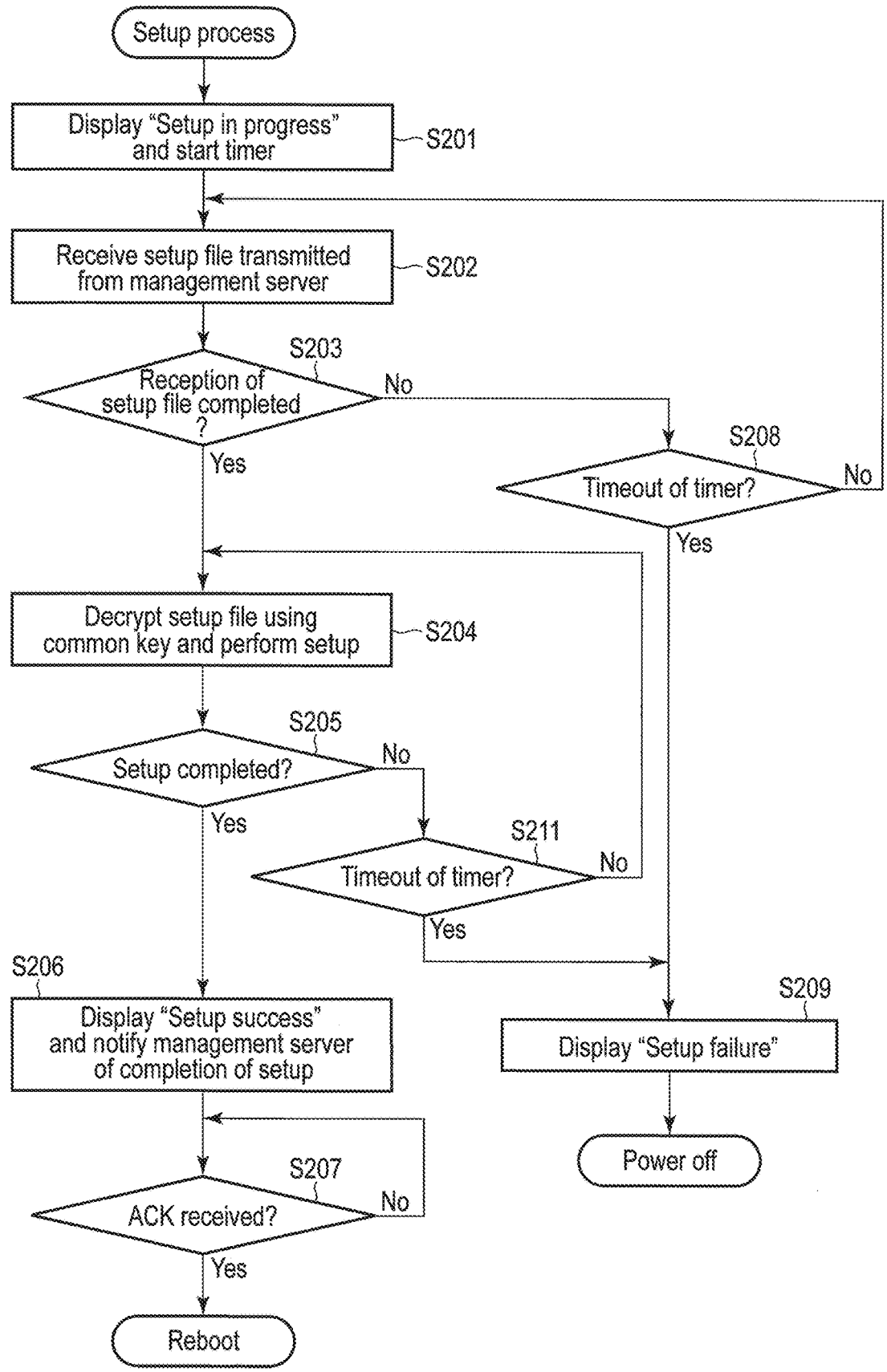
F I G. 7

| Production number | Computer name | Group name | State | LAN security setting | | | | | Update date and time |
|---|---|---|---|---|---|---|---|---|---|
| | | | | Identifier | User certificate | Private key | Private password | Common key | |
| XXX001 | client1 | group1 | Normal | id001 | authority001 | pkey001 | pw001 | ckey001 | 2018/5/16 10:00 |
| XXX002 | client2 | group1 | Normal | id002 | authority002 | pkey002 | pw002 | ckey002 | 2018/5/17 15:00 |
| XXX003 | client3 | group2 | Normal | id003 | authority003 | pkey003 | pw003 | ckey003 | 2018/5/19 12:00 |
| ... | ... | ... | ... | ... | ... | ... | ... | ... | ... |

F I G. 15

| Group name | Management server URL | Download server URL | VDI server URL | BIOS setting kitting file name | ... |
|---|---|---|---|---|---|
| group1 | https://xxx.xxx/OS/yyy | https://xxx.xxx/DL/ | https://vdsite0000.com/Vdi/Website/ | file001 | ... |
| group2 | https://xxx.xxx/OS/yyy | https://xxx.xxx/DL/ | https://vdsite0000.com/Vdi/Website/ | file002 | ... |
| ... | ... | ... | ... | ... | ... |

| Communication setting | | | | |
|---|---|---|---|---|
| Number of retry | Retry interval | Polling interval | Action upon disconnection | Domain |
| 10 | 30 seconds | 10 seconds | Power off | domain001 |
| 8 | 20 seconds | 10 seconds | Screen lock | domain002 |
| ... | ... | ... | ... | ... |

F I G. 16

| Category | | Data format |
|---|---|---|
| Computer name | | Text |
| LAN security setting (Identifier) | | Text |
| LAN security setting (User certificate) | File name | Text |
| | File update date and time | Date |
| | File body | Base64 |
| LAN security setting (Private key) | File name | Text |
| | File update date and time | Date |
| | File body | Base64 |
| LAN security setting (Private password) | | Text |
| Management server URL | | Text |
| Download server URL | | Text |
| VDI server URL | | Text |
| BIOS setting kitting file | File name | Text |
| | File update date and time | Date |
| | File body | Base64 |
| Communication setting (Number of retry) | | Text |
| Communication setting (Retry interval) | | Text |
| Communication setting (Polling interval) | | Text |
| Communication setting (Action upon disconnection) | | Text |
| Communication setting (Domain) | | Text |
| Update date and time | | Date |

F I G. 19

| Category | Data format |
|---|---|
| Language setting | Selection (Japanese/English) |
| Keyboard setting | Selection (Japanese/English/German) |
| Time zone | Character string |
| Priority band of wireless LAN | Selection (Non, 5.2GHz, 2.4GHz) |
| Aggressiveness of wireless LAN roaming | Selection (Low/Medium/High) |
| Network mode | Selection (Auto/Wired/WiFi) |
| SSID for priority connection of wireless LAN | Selection |
| Authentication method for priority connection of wireless LAN | Selection (WEP, WPA-Enterprise (PEAP/TLS)) |
| User name for priority connection of wireless LAN | Selection |
| Password for priority connection of wireless LAN | Selection |

F I G. 20

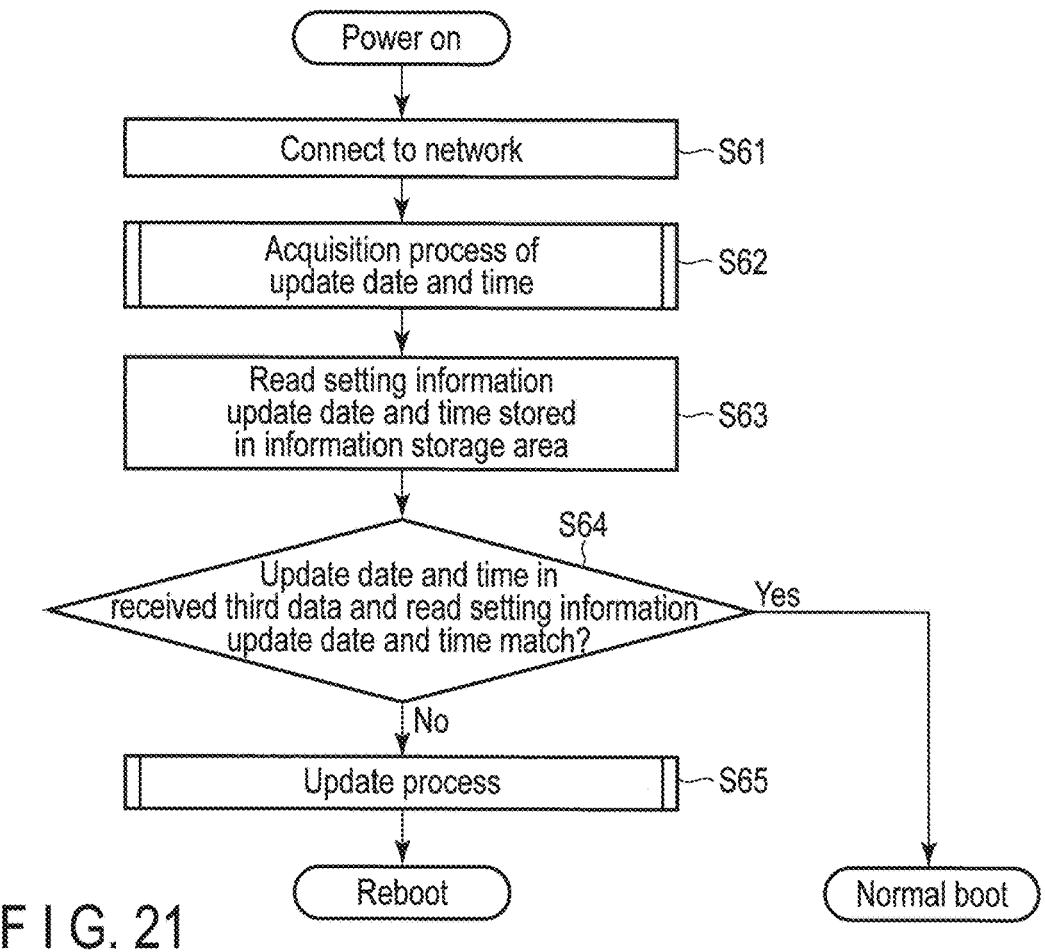

F I G. 21

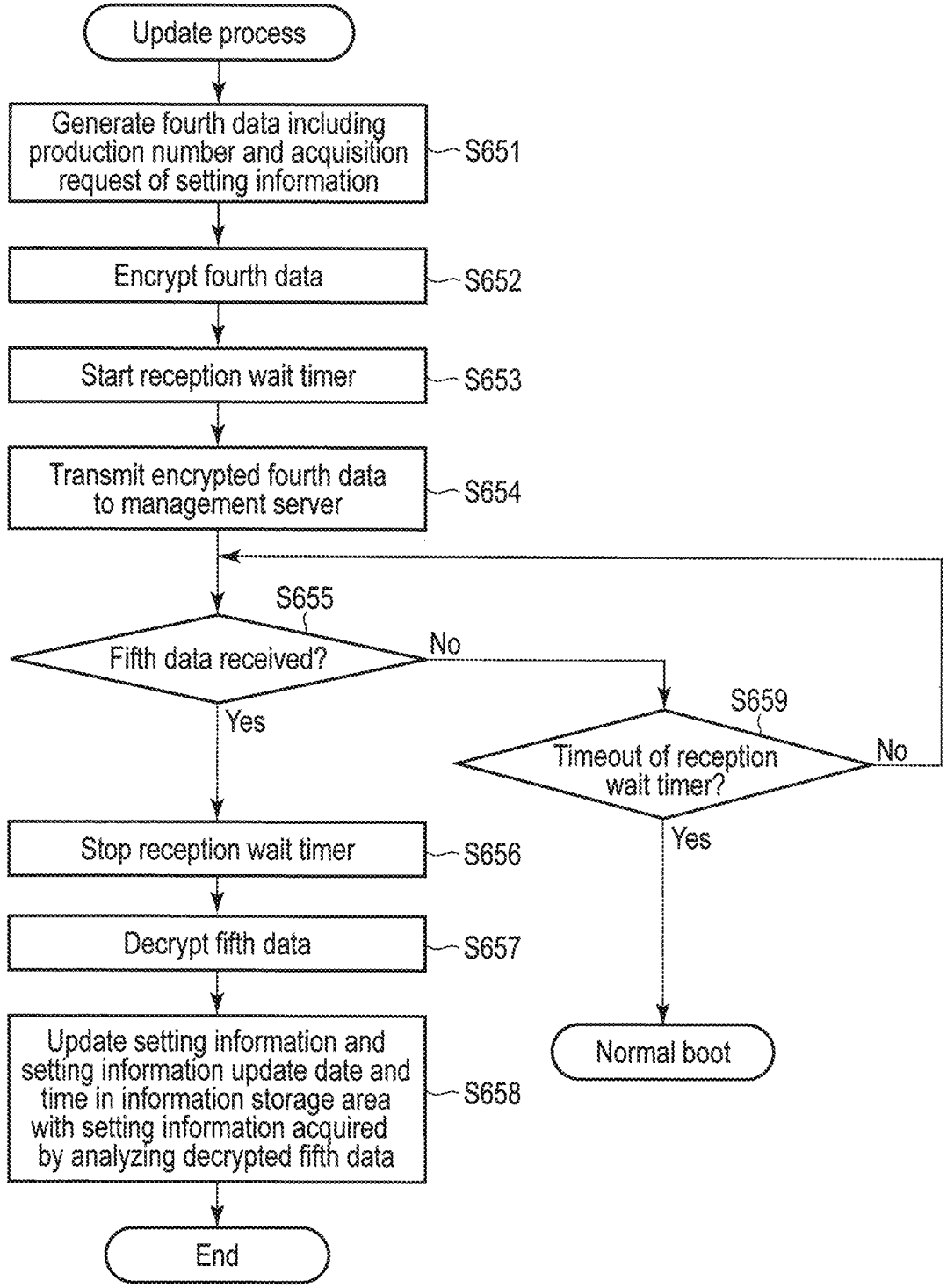
F I G. 23

CONTROL SYSTEM, ELECTRONIC DEVICE, AND CONTROL METHOD

CROSS-REFERENCE TO RELATED APPLICATIONS

This application is based upon and claims the benefit of priority from Japanese Patent Applications No. 2018-107868, filed Jun. 5, 2018; and No. 2018-143730, filed Jul. 31, 2018, the entire contents of all of which are incorporated herein by reference.

FIELD

Embodiments described herein relate generally to a control system, an electronic device, and a control method.

BACKGROUND

In recent years, the number of data leakage incidents is increasing because client terminals such as a personal computer are lost and stolen. Thus, thin client terminals that communicate with servers providing virtual desktop environments are now introduced into infrastructure corporations, hospitals, and the like where strict data management is required.

Each thin client terminal may download data used for setup (initial setting) from a server. In that case, for example, a URL of the server, a file name of a file to be downloaded, and the like are set to the thin client terminals beforehand.

However, in this method, setting is required for each thin client terminal, and thus, a great workload is required in a system including many thin client terminals.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 shows a configuration example of lease information used in the control system of the first embodiment.

FIG. 4 shows a configuration example of thin client information used in the control system of the first embodiment.

FIG. 5 shows an example where the thin client information of FIG. 4 is updated in accordance with setup of a thin client terminal.

FIG. 7 is a flowchart showing an example of the procedure of a setup process in the boot control process of FIG. 6.

FIG. 15 shows a configuration example of thin client information used in the control system of the second embodiment.

FIG. 16 shows a configuration example of group information used in the control system of the second embodiment.

FIG. 19 shows a configuration example of setting information transmitted from a management server to a thin client terminal in the control system of the second embodiment.

FIG. 20 shows an example of contents described in BIOS kitting file in the setting information of FIG. 19.

FIG. 21 is a flowchart showing an example of the procedure of an update control process executed by the thin client terminal in the control system of the second embodiment.

FIG. 23 is a flowchart showing an example of the procedure of an update process in the update control process of FIG. 21.

DETAILED DESCRIPTION

Various embodiments will be described hereinafter with reference to the accompanying drawings.

In general, according to one embodiment, a control system includes a first client terminal, a first server, and a second server. The first client terminal transmits an assignment request of an Internet Protocol (IP) address to the first server. The assignment request includes first identification information that uniquely identifies the first client terminal and is set as a first host name. The first server assigns a first IP address to the first client terminal in accordance with the assignment request, and transmits the first IP address and the first host name to the second server. The second server stores one or more items of second identification information that uniquely identify one or more client terminals respectively, in a memory. Each of the one or more client terminals is subject to a setup process. The second server receives the first IP address and the first host name from the first server. The second server transmits, when the one or more items of the second identification information include the first identification information set as the first host name and when the setup process of the first client terminal has not been performed, data for the setup process of the first client terminal to the first client terminal using the first IP address.

First Embodiment

Figure 1:
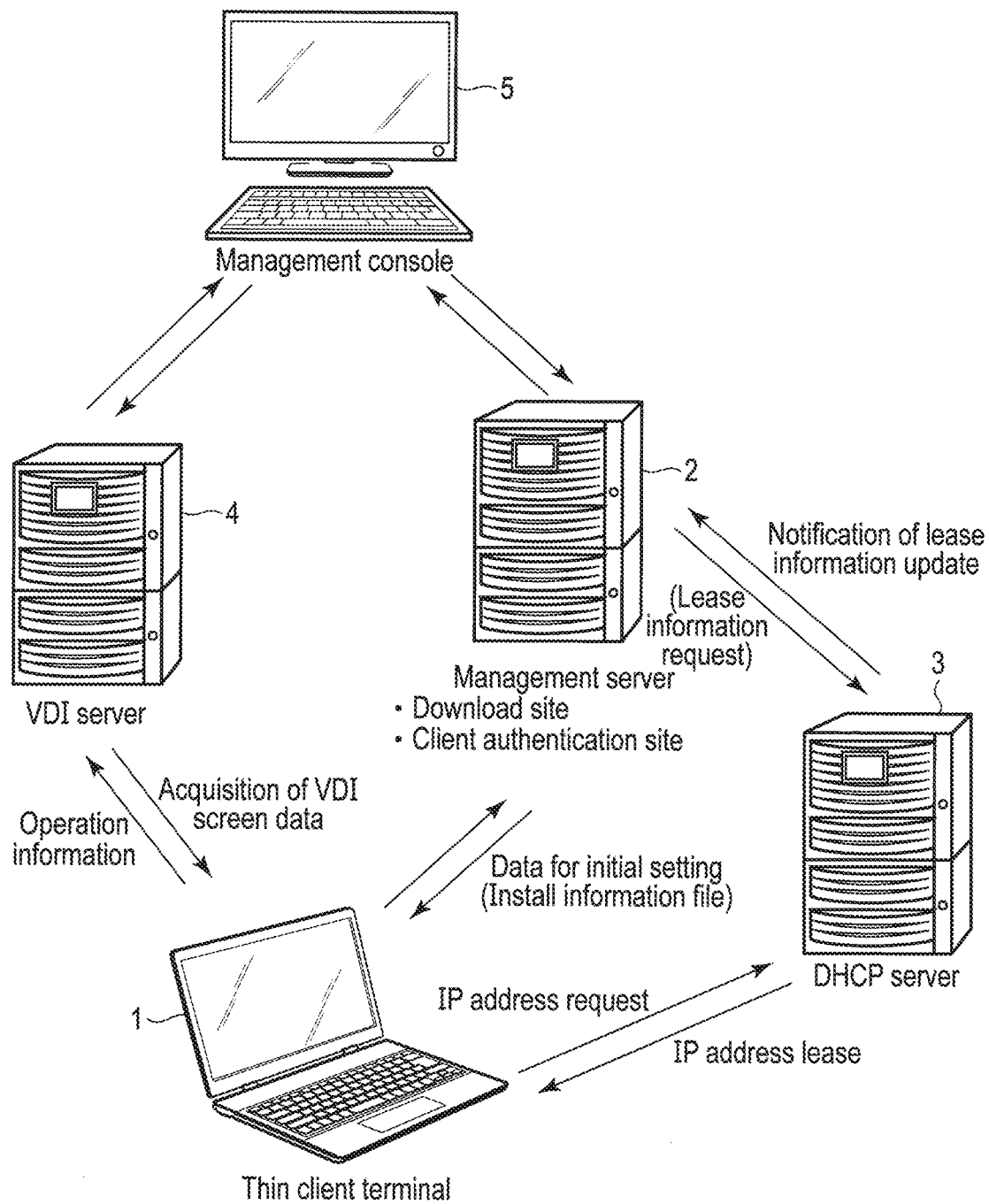
FIG. 1 shows an exemplary configuration of a control system according to a first embodiment.

A control system of a first embodiment will be explained with reference to FIG. 1. The control system includes a thin client terminal 1, a management server 2 used to provide a virtual desktop environment with the thin client terminal 1, a dynamic host configuration protocol (DHCP) server 3, a VDI server 4, and a management console 5.

The thin client terminal 1 is an information processing apparatus that functions as a client to communicate with the management server 2, the DHCP server 3, and the VDI server 4. The thin client terminal 1 may be a clamshell device like a notebook-type personal computer or may be a slate-type device like a tablet computer. Hereinafter, the thin client terminal 1 is realized as a notebook-type device.

The thin client terminal 1 may communicate with the management server 2 via a network such as wireless LAN or wired LAN. The thin client terminal 1 may communicate with the DHCP server 3 that manages lease of IP addresses via the network. The thin client terminal 1 may communicate with the VDI server 4 that provides a virtual desktop environment with each of client terminals including the thin client terminal 1 via the network.

The management server 2 has a function of verifying whether the thin client terminal 1 is an authenticated thin client terminal. The management server 2 also has a function of providing data for a setup process (install information file), and program and information required to communicate with the VDI server 4 with each thin client terminal 1 verified as the authenticated thin client terminal. That is, the management server 2 functions as a client verification site and a download site.

The DHCP server 3 leases (assigns) an IP address to the thin client terminal 1, and provides information related to the leased IP address with the management server 2. An IP address is an identification number on the network using TCP/IP protocol, and may be referred to as a network address.

The VDI server 4 may use several types of techniques to realize a virtual desktop environment. One of them is Virtual Desktop Infrastructure (VDI).

In the present embodiment, VDI may be used as a technique to realize the virtual desktop environment. In that case, the VDI server 4 functions as a server that provides a virtual desktop environment using VDI. The thin client terminal 1 functions as a VDI client terminal. The VDI server 4 provides the virtual desktop environment by receiving operation data on the thin client terminal 1 and by transmitting image data of the screen of the thin client terminal 1 (VDI screen data) and image data corresponding to updated parts on the screen. In the thin client terminal 1, by displaying the image data on the screen, the desktop environment generated by a virtual machine executed on the VDI server 4 can be used as if it is a desktop environment operated by the thin client terminal 1 itself.

The management console 5 is a terminal for a manager to set a client policy used by the management server 2 and a VDI policy used by the VDI server 4. The management server 2 has a function of providing, for example, web-based graphical user interface (GUI) used to change and apply the setting of the client policy with the management console 5. The VDI server 4 has a function of providing web-based GUI used to change and apply the setting of the VDI policy with the management console 5.

In such a system, when a thin client terminal 1 in which a setup process (hereinafter, also referred to as setup) has not been performed is booted, the thin client terminal 1 requires to receive (download) data for the setup process from the management server 2. The data for the setup process is used to set (install) various information (parameters) to the thin client terminal 1 in the setup process, and is served as, for example, an XML-format file. Hereinafter, the data for the setup process may be referred to as a setup file.

In order that the booted thin client terminal 1 (before executing the setup process) accesses the management server 2, it may be considered that an URL of the management server 2, a file name of a file to be downloaded, information indicative of a password and the like, are previously set to the thin client terminal 1. Such setting may be performed by using a BIOS menu or a configuration file stored in a USB flash memory, or by storing the setting into option data in the DHCP server 3, for example.

However, in the method using the BIOS menu or the configuration file stored in the USB flash memory, setting operation must be performed in each thin client terminal 1, and a great workload for the setting is required in a system including many thin client terminals 1. Furthermore, in the method storing the setting into the option data in the DHCP server 3, all thin client terminals connected to the DHCP server 3 may acquire the setup file from the management server 2 without any identification process. This method may function well in a system on a local network such as intranet, but may be vulnerable in other system.

Therefore, in the present embodiment, in order that the thin client terminal 1 receives the setup file from the management server 2, information transmitted when the thin client terminal 1 requests the DHCP server 3 to lease (assign) an IP address is used.

Specifically, the thin client terminal 1 sets a production number (also referred to as a serial number) thereof as a host name, and requests the DHCP server 3 to lease an IP address. The production number to be set may be encrypted. In accordance with the request, the DHCP server 3 leases an IP address to the thin client terminal 1, and provides updated lease information to the management server 2.

When the host name included in the lease information corresponds to a production number of a thin client terminal 1 that is previously registered with the management server 2, and if a setup process is not performed to the thin client terminal 1 yet, the management server 2 transmits a setup file to the thin client terminal 1 using the IP address leased to the thin client terminal 1. Note that, when the production number set as the host name is encrypted, the management server 2 decrypts the host name, and determines whether the decrypted host name corresponds to a production number of a thin client terminal 1 previously registered. When the decrypted host name corresponds to the production number of the thin client terminal 1 previously registered, and if a setup process is not performed to the thin client terminal 1 yet, the management server 2 transmits a setup file to the thin client terminal 1. The setup file may be encrypted.

As can be understood from the above, the thin client terminal 1, the DHCP server 3, and the management server 2 work in cooperation. Thus, only the registered client terminal 1 can be subjected to the setup process using information required for the registered thin client terminal 1 through a simple process via network without performing any operation previously by a manager to the thin client terminal 1 and/or the DHCP server 3. Thus, the workload for the manager can be reduced and the security can be improved.

The functional configurations of the thin client terminal 1, the management server 2, and the DHCP server 3 will be explained with reference to FIG. 2.

The thin client terminal 1 includes a display control module 11, a common key generation module 12, an encryption/decryption module 13, a network processing module 14, a setup processing module 15, and an information storage area 16.

The display control module 11 controls displaying information that corresponds to a condition of the thin client terminal 1 and an operation by a user on a screen of a display (for example, LCD) of the thin client terminal 1. The user inputs an operation to the thin client terminal 1 using a keyboard and various pointing devices such as a mouse, a touchpad, and a touch panel.

The display control module 11 may control displaying as follows.

(1) While the thin client terminal 1 is being powered on until it is connected to a network, information indicative of processing for network connection (for example, "Connecting to Network") is displayed.

(2) During the setup process of the thin client terminal 1, information indicative of setup (for example, "Setup in progress. Downloading data from Management Server. Please stand by and Do Not turn off device."), and/or information indicative of progress of the setup (for example, time and amount of process until the completion) is displayed.

(3) Information indicative of success of the setup of the thin client terminal 1 (for example, "Installed successfully. Rebooted.") is displayed.

(4) Information indicative of failure of the setup of the thin client terminal 1 (for example, "Install failure. Please perform setup again.") is displayed.

Note that the displayed information may be a text or an image.

The common key generation module 12 generates a common key used for exchanging data with the management server 2. The common key generation module 12 generates a common key by using, for example, a production number 161 (identification information) recorded in the thin client terminal 1.

By using the common key, the encryption/decryption module 13 encrypts data to be directly or indirectly sent to the management server 2, and decrypts data encrypted by the management server 2.

The network processing module 14 controls communication with other devices such as the management server 2, DHCP server 3, and VDI server 4 through the network.

Specifically, the network processing module 14 transmits a request for assignment (lease) of an IP address to the DHCP server 3 when the thin client terminal 1 has been turned on. The network processing module 14 may transmit the request for assignment to the DHCP server 3 in response to another event such as a user's operation.

The request for assignment includes, when the setup process has been performed to the thin client terminal 1, a computer name of the thin client terminal 1 set as a host name.

On the other hand, when the setup process has not been performed to the thin client terminal 1, the request for assignment includes identification information that uniquely identifies the thin client terminal 1 and is set as a host name. The identification information is, for example, the production number 161 of the thin client terminal 1. The network processing module 14 reads the production number 161 from the information storage area 16, and transmits to the DHCP server 3 the request for assignment including the production number 161 set as the host name.

The network processing module 14 may set identification information encrypted by the encryption/decryption module 13 using the common key as the host name in the request for assignment. Alternatively, the production number 161 encrypted by the encryption/decryption module 13 using the common key may be used as the identification information.

The network processing module 14 receives an IP address, which is assigned in accordance with the request for assignment, from the DHCP server 3. The network processing module 14 connects the thin client terminal 1 to a wireless or wired network using the received IP address, and controls the communication with the other devices.

When the setup process has not been performed, the thin client terminal 1 transitions to a state to wait for start of the setup process (initial setting) after receiving the IP address. In that case, the network processing module 14 receives a setup file from the management server 2. The setup file may be encrypted. In that case, the encryption/decryption module 13 decrypts the setup file using the common key.

The setup processing module 15 analyzes the setup file (or decrypted setup file) and subjects the thin client terminal 1 to the initial setting. Specifically, the setup processing module 15 writes one or more items of information (parameters) included in the setup file to the information storage area 16. The information storage area 16 is, for example, a specific storage area in a BIOS-ROM. The one or more items of information may include, for example, a computer name, a URL of the management server 2, a URL of the VDI server 4, a password, and a client certificate, and other information for the setup.

When setup using the setup file has completed, the network processing module 14 notifies the management server 2 of success of the setup, and reboots the thin client terminal 1. The thin client terminal 1 may transition to a normally started state instead of rebooting.

On the other hand, when the setup using the setup file has failed, the thin client terminal 1 is turned off. For example, if the setup processing module 15 cannot write information in the setup file to the information storage area 16, the failure of setup is recognized.

The setup processing module 15 may start a timer 151 when the network processing module 14 has started receiving the setup file from the management server 2. The timer 151 is used to manage the progress of receiving the setup file and executing setup using the setup file (that is, installing the setup file). In the timer 151, a time to detect a timeout while the setup file is being received, and a time to detect a timeout while the setup using the setup file is being executed, are set.

When the timer 151 has detected a timeout while the setup file is being received, the network processing module 14 stops receiving the setup file and turns off the thin client terminal 1. When the timer 151 has detected a timeout while the setup using the setup file is being executed, the setup processing module 15 stops executing the setup and turns off the thin client terminal 1.

The DHCP server 3 includes a lease control module 31, a reception control module 32, a lease information notification module 33, and a transmission control module 34. The reception control module 32 may receive data transmitted from the management server 2 and the thin client terminal 1. The transmission control module 34 may transmit data to the management server 2 and the thin client terminal 1.

The reception control module 32 receives, for example, a request for assignment of an IP address from the thin client terminal 1. The request for assignment includes a host name.

In accordance with the received request for assignment, the lease control module 31 selects an IP address from IP addresses that are not assigned yet to any device, and assigns the selected IP address to the thin client terminal 1. The lease control module 31 detects IP addresses assignable to the thin client terminal 1 by using, for example, lease information 35 stored in the DHCP server 3.

FIG. 3 shows a configuration example of the lease information 35. The lease information 35 includes one or more records corresponding to one or more IP addresses managed by the DHCP server 3.

Each record includes, for example, an IP address field, a host name field, a lease date and time field, and an expiration date and time field. In a record corresponding to an IP address, the IP address field indicates the IP address. A value such as "192.168.1.1" is set in the IP address field.

The host name field indicates a name given to a host to which the IP address is leased. The host is, for example, the thin client terminal 1. When the host notifies the DHCP server 3 of a host name (for example, "client1"), the host name is set in the host name field. When the host notifies the DHCP server 3 of a production number (for example, "XXX003") as the host name, the production number is set in the host name field. Alternatively, when the host notifies the DHCP server 3 of an encrypted production number (for example, encrypted "XXX003") as the host name, the encrypted production number is set in the host name field.

The lease date and time field indicates a date and time of when leasing of the IP address to the host starts. A date and time such as "2018/5/24, 8:30" is set in the lease date and time field.

The expiration date and time field indicates a deadline representing when leasing of the IP address is allowed to the host. A date and time such as "2018/5/24, 11:30" is set in the expiration date and time field. The value set in the expiration date and time field may be represented as a period from the lease date and time (for example, days, hours, or the like).

By using a value in the expiration date and time field, or by using values in the lease date and time field and in the expiration date and time field, the lease control module 31 determines whether the IP address corresponding to each record is currently being assigned to a host or whether the IP address can be assigned to another host since the current date and time reaches the expiration date and time. The DHCP server 3 assigns an IP address of assignable IP addresses to a new host (thin client terminal 1) requiring the assignment.

When an IP address is newly assigned, the lease control module 31 updates the lease information 35 using the IP address and the host name in the request for assignment. That is, in the record corresponding to the newly assigned IP address, values of a host name, a lease date and time, and an expiration date and time are set (updated).

Then, the lease control module 31 notifies the thin client terminal 1 of the assigned IP address (that is, transmits the assigned IP address to the thin client terminal 1) through the transmission control module 34.

The lease control module 31 sends the newly assigned IP address and the host name in the request for assignment to the lease information notification module 33. The lease information notification module 33 transmits the newly assigned IP address and the host name in the request for assignment to the management server 2 through the transmission control module 34. The lease information notification module 33 may transmit the record corresponding to the newly assigned IP address of the lease information 35 to the management server 2. Alternatively, the lease information notification module 33 may transmit the lease information 35 as it is to the management server 2.

The lease information notification module 33 may monitor the lease information 35. The lease information notification module 33 may transmit, when a record in the lease information 35 is updated, the IP address and the host name in the updated record to the management server 2. The monitoring is realized by using, for example, a DHCP command of power shell.

The management server 2 includes a control module 21, a reception control module 22, an encryption/decryption module 23, a client verification module 24, a setup file generation module 25, a common key generation module 26, a transmission control module 27, and a database 29. The database 29 stores setup information 29A and thin client information 29B.

The setup information 29A includes one or more items of information (one or more parameters) that are to be set (installed) in setup process with respect to one or more thin client terminals 1, respectively. The one or more thin client terminals 1 are managed by the management server 2. The one or more items of information may include, for example, a computer name, a management server URL, a VDI server URL, a client certificate, a password, and other information to be initially set to the thin client terminal 1.

FIG. 4 shows a configuration example of the thin client information 29B. The thin client information 29B includes one or more records corresponding to one or more thin client terminals 1 managed by the management server 2. In other words, the one or more thin client terminals 1 are registered with the management server 2.

Each record includes, for example, a production number field, a computer name field, a state field, a management server URL field, a VDI server URL field, a client certificate field, a common key field, and an information update date and time field.

In a record corresponding to a thin client terminal 1, the production number field shows identification information indicative of a production number uniquely assigned for managing the thin client terminal 1. Thus, the management server 2 uniquely identifies each of the thin client terminals 1, based on the production number assigned thereto.

Note that, instead of the production number, a different value that uniquely identifies the thin client terminal 1 (for example, a physical address such as MAC address) may be used.

The computer name field indicates a computer name given to the thin client terminal 1. The management server 2 gives the computer name at the time of setup of the thin client terminal 1, for example. The computer name may be used as a host name when the thin client terminal 1 that has been subjected to the setup requests the DHCP server 3 to lease an IP address.

The state field shows state information indicative of a state of the thin client terminal 1. For example, one of "Pre-setup", "Normal", and "Locked" is set in the state field. The "Pre-setup" indicates that the thin client terminal 1 has not been subjected to the setup (initial setting). The "Normal" indicates that the thin client terminal 1 has been subjected to the setup and the thin client terminal 1 functions properly. The "Locked" indicates that the management server 2 prohibits the thin client terminal 1 from being booted.

The management server URL field indicates an address on a network used by the thin client terminal 1 to access the management server 2. The VDI server URL field indicates an address on a network used by the thin client terminal 1 to access the VDI server 4 after the thin client terminal 1 is properly booted.

The client certificate field indicates a certificate used by the thin client terminal 1 to login the VDI server 4 or to connect to the wireless LAN.

The common key field indicates a common key used in data exchange between the thin client terminal 1 and the management server 2. That is, the common key is used in encryption and decryption of data by the thin client terminal 1, and is used in encryption and decryption of data by the management server 2.

The data update date and time field indicates an update date and time of registered information (that is, the update date and time of the record) of the thin client terminal 1. Based on the update date and time, it is determined whether the registered information (record) is updated after the management server 2 performed the latest setting, install, and the like to the thin client terminal 1.

In the production number field among the above-described fields of the record, for example, the production number of the thin client terminal 1 is set when an administrator registers the thin client terminal 1 with the management server 2. At the registration, the "Pre-setup" may be set in the state field of the record. On the other hand, no value is set in the other fields of the computer name, the management server URL, the VDI server URL, the client certificate, the common key, and the data update date and time at the registration, but values are set thereto when the setup has been completed in the thin client terminal 1. Thus, in the record corresponding to the thin client terminal 1 that has been subjected to the setup, values are set in all fields.

Figure 2:
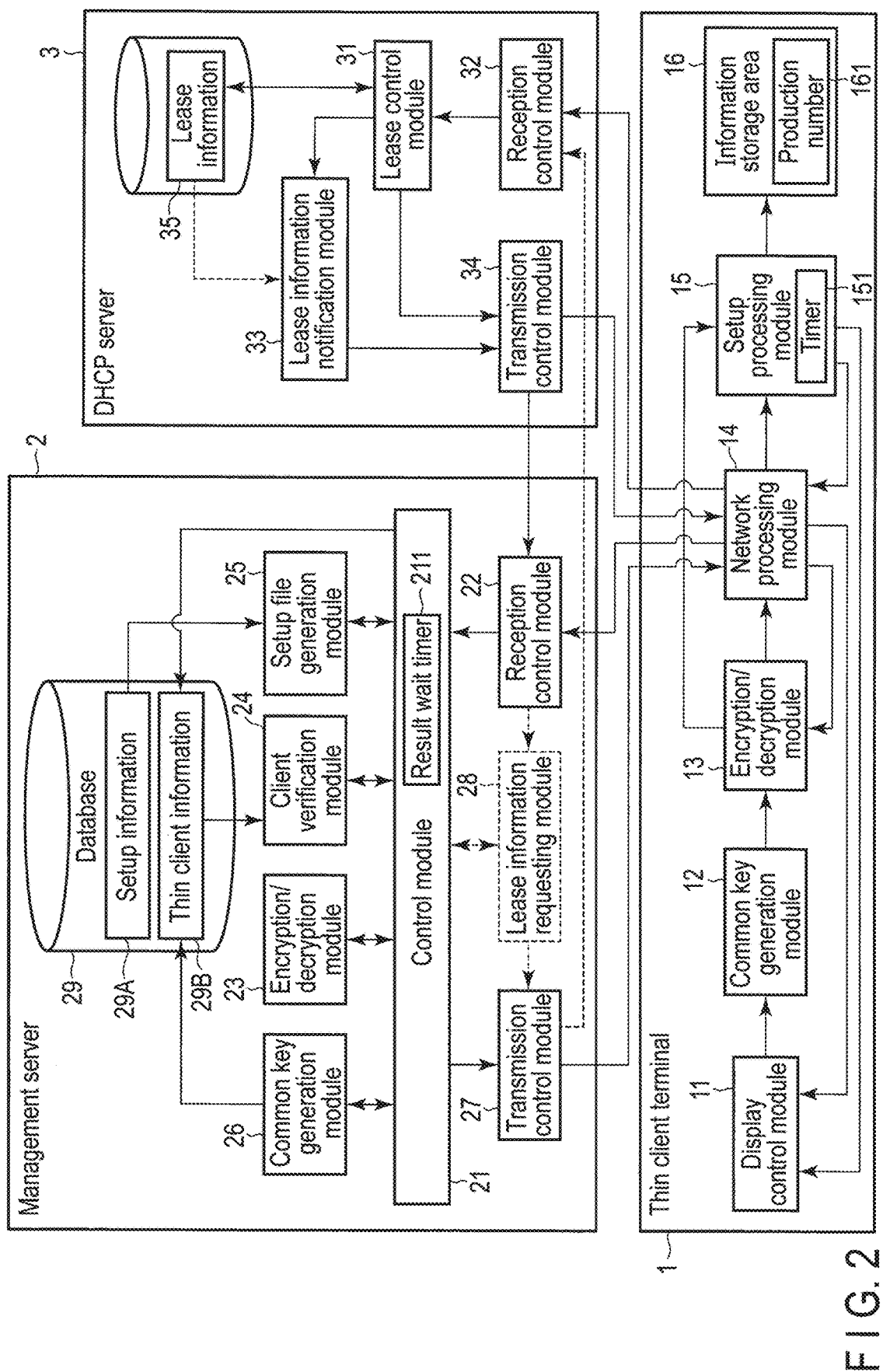
FIG. 2 is an exemplary block diagram showing a functional configuration of the control system of the first embodiment.

As shown in FIG. 2, the control module 21 controls the operation of each component in the management server 2. The control module 21 may receive data transmitted from the DHCP server 3 or the thin client terminal 1 through the reception control module 22. The control module 21 may transmit data to the DHCP server 3 or the thin client terminal 1 through the transmission control module 27.

The common key generation module 26 generates a common key to be used in data exchange with each of thin client terminals 1 registered with the management server 2. The common key generation module 26 may generate a common key using, for example, a production number (identification information) of each thin client terminal 1 included in the thin client information 29B. The common key generation module 26 and the common key generation module 12 of the thin client terminal 1 generate the same common key using the production number of the thin client terminal 1.

By using the common key of the thin client terminal 1, the encryption/decryption module 23 encrypts data to be sent to the thin client terminal 1, and decrypts data encrypted by the thin client terminal 1.

The client verification module 24 verifies whether a terminal requesting the DHCP server 3 to assign an IP address is a thin client terminal 1 registered with the management server 2 using the thin client information 29B.

The setup file generation module 25 generates a setup file corresponding to each thin client terminal 1 using the setup information 29A. The setup file includes information (parameters) to be set (installed) to the corresponding client terminal 1. The information to be set may include, as described above, a URL of the management server 2, a URL of the VDI server 4, a password, a client certificate, and other information for setup. When the process using the setup file is performed on the thin client terminal 1, the information (parameters) is stored into a specific storage area (for example, BIOS area).

Now, the operations of each component when the control module 21 receives an IP address and a host name from the DHCP server 3 through the reception control module 22 will be explained. The control module 21 sends the received host name to the encryption/decryption module 23.

The common key generation module 26, the encryption/decryption module 23, and the client verification module 24 determine whether the received host name corresponds to one of the thin client terminals 1 registered with the management server 2 by using the thin client information 29B. That is, whether a terminal having the received host name is a thin client terminal 1 registered with the management server 2 is determined.

Specifically, the common key generation module 26 and the client verification module 24 read a record from the thin client information 29B. The common key generation module 26 generates a common key by using a production number indicated by the record. The encryption/decryption module 23 decrypts the received host name by using the generated common key. Then, the client verification module 24 determines that the received host name corresponds to the thin client terminal 1 registered with the management server 2 when the production number indicated by the record matches the decrypted host name.

On the other hand, when the production number indicated by the record does not match the decrypted host name, a different record is read from the thin client information 29B, and whether the received host name corresponds to another thin client terminal 1 registered with the management server 2 is determined using the different record. When a production number does not match the decrypted host name with respect to all of the records in the thin client information 29B, the client verification module 24 determines that the received host name does not correspond to any of the thin client terminals 1 registered with the management server 2.

When the received host name corresponds to the thin client terminal 1 registered with the management server 2, the client verification module 24 determines whether the thin client terminal 1 has been subjected to setup. Based on the corresponding record in the thin client information 29B that includes the state field in which "Pre-setup" is set, or that includes the management server URL field and the common key field in which no value is set, the client verification module 24 may determine that the corresponding thin client terminal 1 has not been subjected to the setup (initial setting) yet.

When the thin client terminal 1 has not been subjected to the setup, the setup file generation module 25 generates a setup file to be used for setup of the thin client terminal 1 by using the setup information 29A. The setup file may include a computer name, a URL of management server 2, a URL of VDI server 4, a password for the thin client terminal 1, a client certificate, and the like. The encryption/decryption module 23 may encrypt the generated setup file by using the common key.

The control module 21 transmits the setup file (or encrypted setup file) to the thin client terminal 1 through the transmission control module 27. The transmission control module 27 transmits the setup file to the thin client terminal 1 via P2P communication by using, for example, the IP address received from the DHCP server 3 together with the host name.

Then, the control module 21 may set "Install waiting" in the state field of the record corresponding to the thin client terminal 1 in the thin client information 29B. The control module 21 includes a result wait timer 211. The control module 21 starts the result wait timer 211 in response to transmission of the setup file to the thin client terminal 1. In the result wait timer 211, a time to detect a timeout during the standby waiting for a notification of setup completion from the thin client terminal 1 is set.

When receiving the notification indicative of setup completion using the setup file from the thin client terminal 1 through the reception control module 22, the control module 21 sets "Normal" in the state field in the record corresponding to the thin client terminal 1 in the thin client information 29B, and sets values in the computer name field, the management server URL field, the VDI server URL field, the client certificate field, the common key field, and the data update date and time field, respectively.

FIG. 5 shows an example where "Normal" is set in the state field in the record (of the thin client information 29B) corresponding to the thin client terminal 1 having the production number "XXX003" of FIG. 4 in accordance with the completion of setup. As shown in FIG. 5, in the record of the thin client terminal 1 having the production number "XXX003", values corresponding to the thin client terminal 1 are set in the computer name field, the management server URL field, the VDI server URL field, the client certificate field, the common key field, and the data update date and time field, respectively.

Note that, when the result wait timer 211 has detected the timeout during the standby waiting for a result of setup from the thin client terminal 1, the control module 21 resets "Pre-setup" in the state field in the record corresponding to the thin client terminal 1 in the thin client information 29B.

The management server 2 may further include a lease information requesting module 28 in order to request the DHCP server 3 to transmit lease information 35. The lease information requesting module 28 requests transmission of lease information 35 to the DHCP server 3 through the transmission control module 27. The lease information requesting module 28 transmits a DHCP command to acquire the lease information 35 to the DHCP server 3 at certain intervals or in response to a request from the control module 21, for example.

The lease control module 31 of the DHCP server 3 transmits the lease information 35 to the management server 2 through the transmission control module 34 in accordance with the DHCP command received by the reception control module 32. For example, when the lease information requesting module 28 (management server 2) requests the lease information 35 after an IP address is assigned to a thin client terminal 1, the lease control module 31 transmits the lease information 35 including the assigned IP address and the host name of the thin client terminal 1 to the management server 2.

The lease information requesting module 28 receives the lease information 35 through the reception control module 22. The lease information requesting module 28 compares the lease information 35 acquired in the last request to the lease information 35 acquired in the current request to detect a changed record therebetween. Then, the lease information requesting module 28 transmits the detected record(s) to the control module 21. Thus, as in a case where the host name and the IP address are received from the DHCP server 3 through the reception control module 22, a process to perform setup to a thin client terminal 1 that is registered with the management server 2 but has not been subjected to the setup is executed.

Note that, in that case, the DHCP server 3 may not include the lease information notification module 33, and the lease control module 31 directly transmits the lease information 35 to the management server 2. That is, the functions of the control system of the present embodiment can be achieved using the DHCP server including a conventional configuration for assignment of IP addresses without changing any configuration. Thus, the management server 2 and the thin client terminal 1 can easily be introduced into an environment with the DHCP server 3.

Furthermore, the common key generation module 26 may generate a common key before the thin client terminal 1 is booted, by using a production number of each thin client terminal 1 included in the thin client information 29B. At that time, the encryption/decryption module 23 may generate the encrypted production number beforehand by using the generated common key. Thus, by simply comparing the host name received from the DHCP server 3 to the encrypted production number generated beforehand, the client verification module 24 can determine whether the host name corresponds to a thin client terminal 1 registered with the management server 2.

Note that, as the host name transmitted from the thin client terminal 1 to the DHCP server 3 and transmitted from the DHCP server 3 to the management server 2, an unencrypted production number may be set. In that case, the control module 21 sends the host name to the client verification module 24 without sending it to the encryption/decryption module 23. The client verification module 24 determines whether the host name corresponds to the thin client terminal 1 registered with the management server 2 by using the thin client information 29B. The client verification module 24 determines that the host name corresponds to the thin client terminal 1 registered with the management server 2 when the thin client information 29B includes a record in which the production number corresponding to the host name received from the DHCP server 3 is set, for example.

With the above-described configuration, workload for setup of the thin client terminal 1 can be reduced. Identification information such as a production number of the thin client terminal 1 is sent from the thin client terminal 1 to the management server 2 through the DHCP server 3. The management server 2 can determine whether the terminal to which the IP address is assigned by the DHCP server 3 is a thin client terminal 1 registered with the management server 2 and setup of which is not performed. The management server 2 transmits a setup file for setup to the thin client terminal 1 that is registered and setup of which is not performed. In the thin client terminal 1, setup is performed using the setup file.

Since information including a URL of the management server 2 and a file name of a setup file to be acquired are not required to be set to a thin client terminal 1 before it is operated in the system, the workload for setup can be reduced. Furthermore, since the setup file is exclusively sent to thin client terminals 1 managed by the management server 2, the system can be secured.

Figure 6:
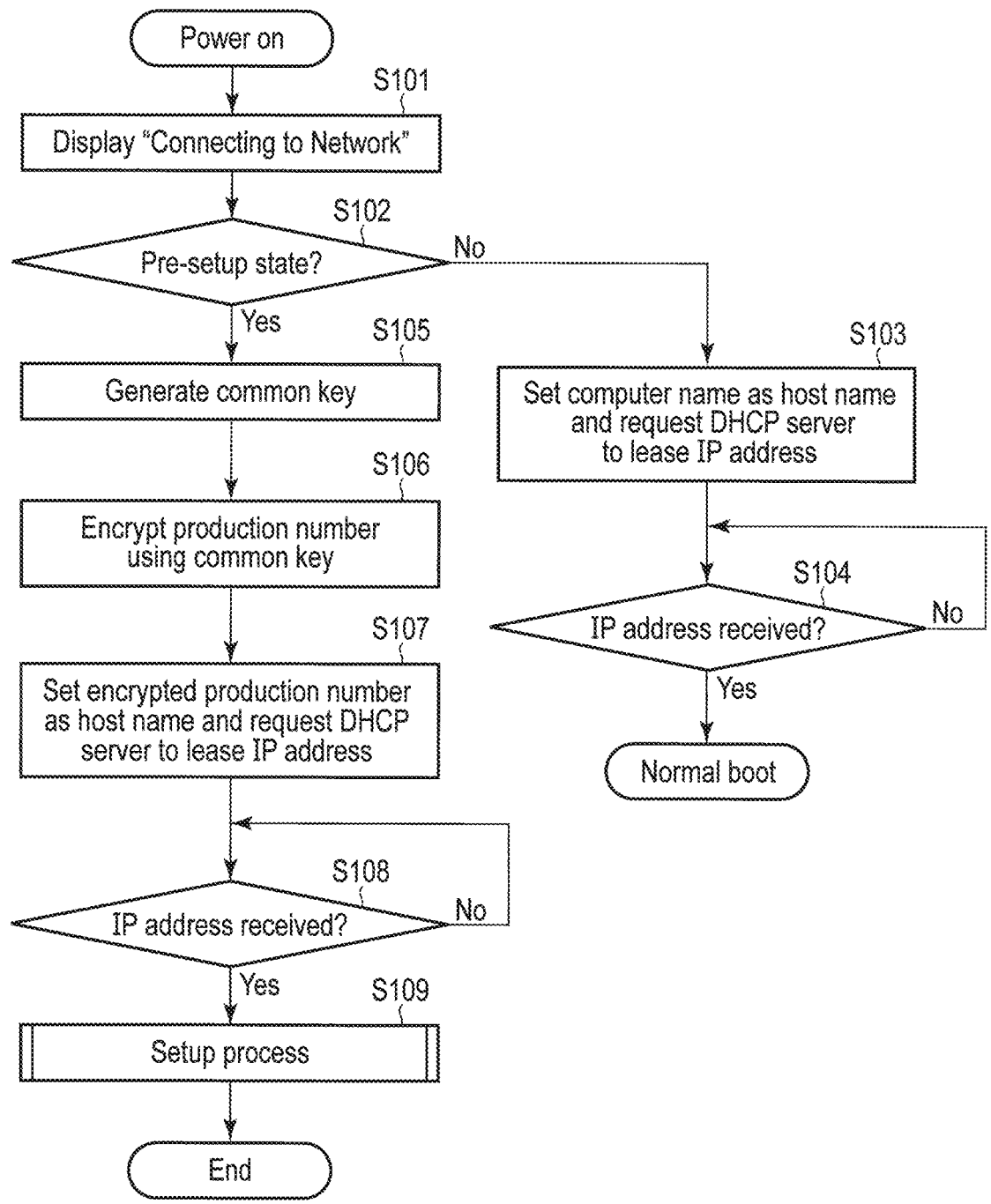
FIG. 6 is a flowchart showing an example of the procedure of a boot control process executed by a thin client terminal in the control system of the first embodiment.

The procedure of a boot control process executed by the thin client terminal 1 will be explained with reference to a flowchart of FIG. 6.

In response to turning on, the thin client terminal 1 displays information indicative of "Connecting network" on the screen (step S101). Then, the thin client terminal 1 determines whether the thin client terminal 1 is in a pre-setup state where setup thereof has not been completed (step S102). The thin client terminal 1 determines that it is in the pre-setup state when no parameter has been set to the information storage area 16 (specific storage area in BIOS), for example.

When the thin client terminal 1 is not in the pre-setup state (NO in step S102), the thin client terminal 1 sets a computer name as a host name and requests the DHCP server 3 to lease an IP address (step S103). Then, the thin client terminal 1 determines whether an IP address has been received from the DHCP server 3 (step S104). When an IP address has not been received (NO in step S104), the process returns to step S104 and whether an IP address has been received from the DHCP server 3 is determined again.

When an IP address has been received (YES in step S104), the thin client terminal 1 is normally started up using the received IP address. The thin client terminal 1 normally started up connects to the management server 2. After the thin client terminal 1 is authenticated as a proper thin client terminal, the thin client terminal 1 connects to the VDI server 4 to function as a VDI client terminal with which a virtual desktop environment is provided.

On the other hand, when the thin client terminal 1 is in the pre-setup state (YES in step S102), the thin client terminal 1 generates a common key (step S105). If a common key has already been generated, step S105 may be skipped. The thin client terminal 1 encrypts a production number of the thin client terminal 1 by using the common key (step S106). Then, the thin client terminal 1 sets the encrypted production number as the host name and requests the DHCP server 3 to lease an IP address (step S107).

Then, the thin client terminal 1 determines whether an IP address has been received from the DHCP server 3 (step S108). When an IP address has not been received (NO in step S108), the process returns to step S108, and whether an IP address has been received from the DHCP server 3 is determined again.

On the other hand, when an IP address has been received (YES in step S108), the thin client terminal 1 performs a setup process (step S109). An example of the procedure of the setup process will be explained with reference to a flowchart of FIG. 7.

Firstly, the thin client terminal 1 displays information indicative of "Setup in progress" on the screen and sets (starts) the timer 151 (step S201). The timer 151 is a timer to manage the progress of the setup process. For example, a time to detect a timeout during the reception of a setup file, and a time to detect a timeout during the setup using the setup file, are set to the timer 151.

The thin client terminal 1 receives the setup file transmitted from the management server 2 (step S202). Then, the thin client terminal 1 determines whether the reception of the setup file has been completed (step S203). When the reception of the setup file has not been completed (NO in step S203), and when the timer 151 has not detected a timeout (NO in step S208), the reception of the setup file in step S202 is continued.

When the reception of the setup file has been completed (step S203), the thin client terminal 1 decrypts the setup file using the common key and performs setup thereof using the decrypted setup file (step S204).

Then, the thin client terminal 1 determines whether the setup has been completed (step S205). When the setup has not been completed (NO in step S205), and when the timer 151 has not detected a timeout (NO in step S211), the setup in step S204 is continued.

When the setup has been completed (YES in step S205), the thin client terminal 1 displays information indicative of "Setup success" on the screen, and notifies the management server 2 of the completion of setup (step S206).

Then, the thin client terminal 1 determines whether ACK indicative of acknowledgement has been received from the management server 2 (step S207). When ACK has not been received (NO in step S207), the process returns to step S207 and whether ACK has been received is determined again. On the other hand, when ACK has been received (YES in step S207), the thin client terminal 1 is rebooted. In response to the reboot, the thin client terminal 1 proceeds to step S101 of the flowchart of FIG. 6 or normally started up.

Note that, when the timer 151 has detected a timeout during the reception of the file (YES in step S208), or when the timer 151 has detected a timeout during the setup (YES in step S211), the thin client terminal 1 displays information indicative of "Setup failure" (step S209), and the thin client terminal 1 is turned off.

Figure 8:
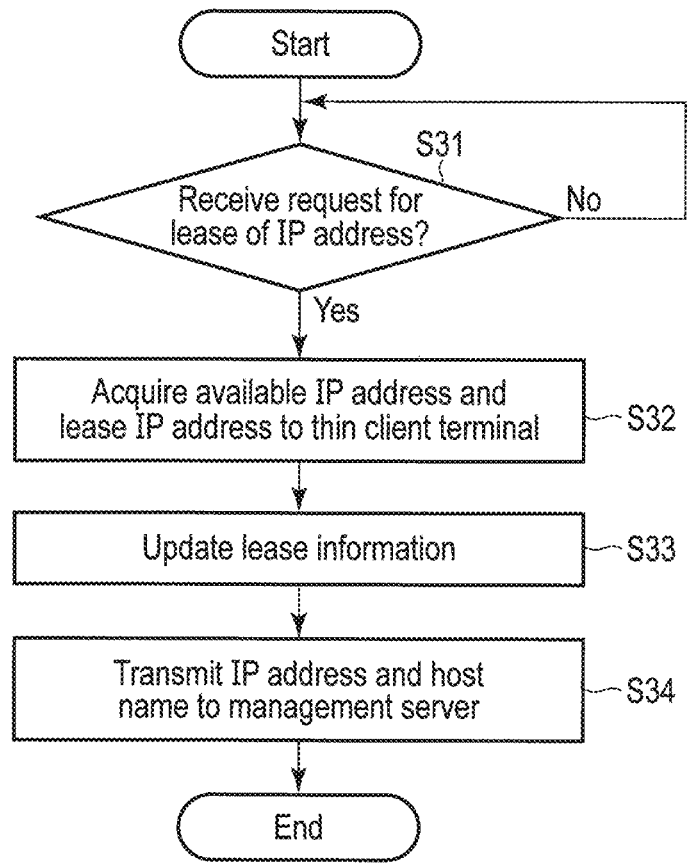
FIG. 8 is a flowchart showing an example of the procedure of a lease control process executed by a dynamic host configuration protocol (DHCP) server in the control system of the first embodiment.

A flowchart of FIG. 8 shows the procedure of a lease control process executed by the DHCP server 3.

Firstly, the DHCP server 3 determines whether a request for lease of an IP address has been received from the thin client terminal 1 (step S31). When a request for lease of an IP address has not been received (NO in step S31), the process returns to step S31, and whether a request for lease of an IP address has been received is determined again.

On the other hand, when a request for lease of an IP address has been received (YES in step S31), the DHCP server 3 acquires an IP address that is not used (unleased) and leases the IP address to the thin client terminal 1 (step S32). The IP address leased is sent to the thin client terminal 1. The DHCP server 3 updates a record corresponding to the leased IP address in lease information 35 (step S33). Specifically, the DHCP server 3 sets a host name included in the request for lease to the host name field of the record, sets a date and time of starting lease to the lease date and time field of the record, and sets an expiration date and time of lease to the expiration date and time field of the record.

Then, the DHCP server 3 transmits the leased IP address and the host name of the thin client terminal 1 (or the IP address and the host name included in the updated record) to the management server 2 (step S34). The DHCP server 3 may transmit the lease information 35 as it is to the management server 2, or the record updated in step S33 to the management server 2.

Figure 9:
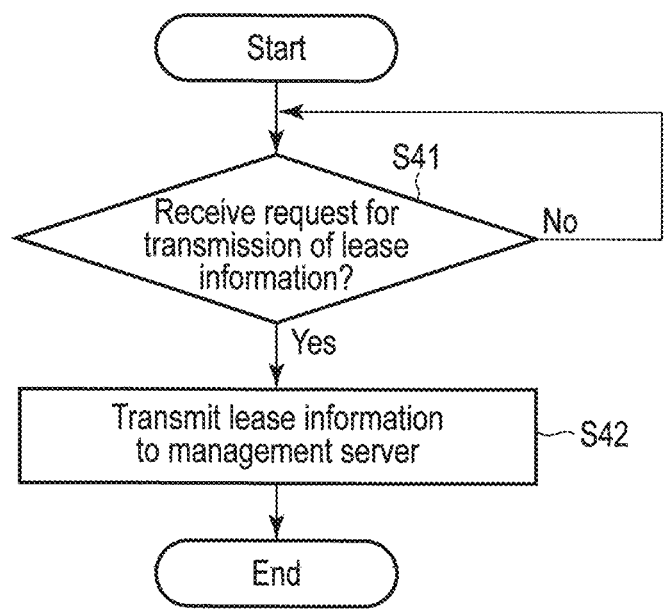
FIG. 9 is a flowchart showing another example of the procedure of the lease control process executed by the DHCP server in the control system of the first embodiment.

A flowchart of FIG. 9 shows another example of the procedure of the lease control process executed by the DHCP server 3.

Firstly, the DHCP server 3 determines whether a request for transmission of lease information 35 has been received from the management server 2 (step S41). When a request for transmission of lease information 35 has not been received (NO in step S41), the process returns to step S41, and whether a request for transmission of lease information 35 has been received is determined again.

On the other hand, when a request for transmission of lease information 35 has been received (YES in step S41), the DHCP server 3 transmits the lease information 35 to the management server 2 (step S42). The DHCP server 3 may transmit the lease information 35 as it is to the management server 2, or only the records updated after the request for transmission is received at the last time may be transmitted to the management server 2 amongst the all records in the lease information 35. Alternatively, values of the IP address field and the host name field of each record updated after the request for transmission is received at the last time may be transmitted.

As can be understood from the above, the DHCP server 3 may transmit the lease information 35 or a part thereof to the management server 2 in accordance with the request from the management server 2.

Figure 10:
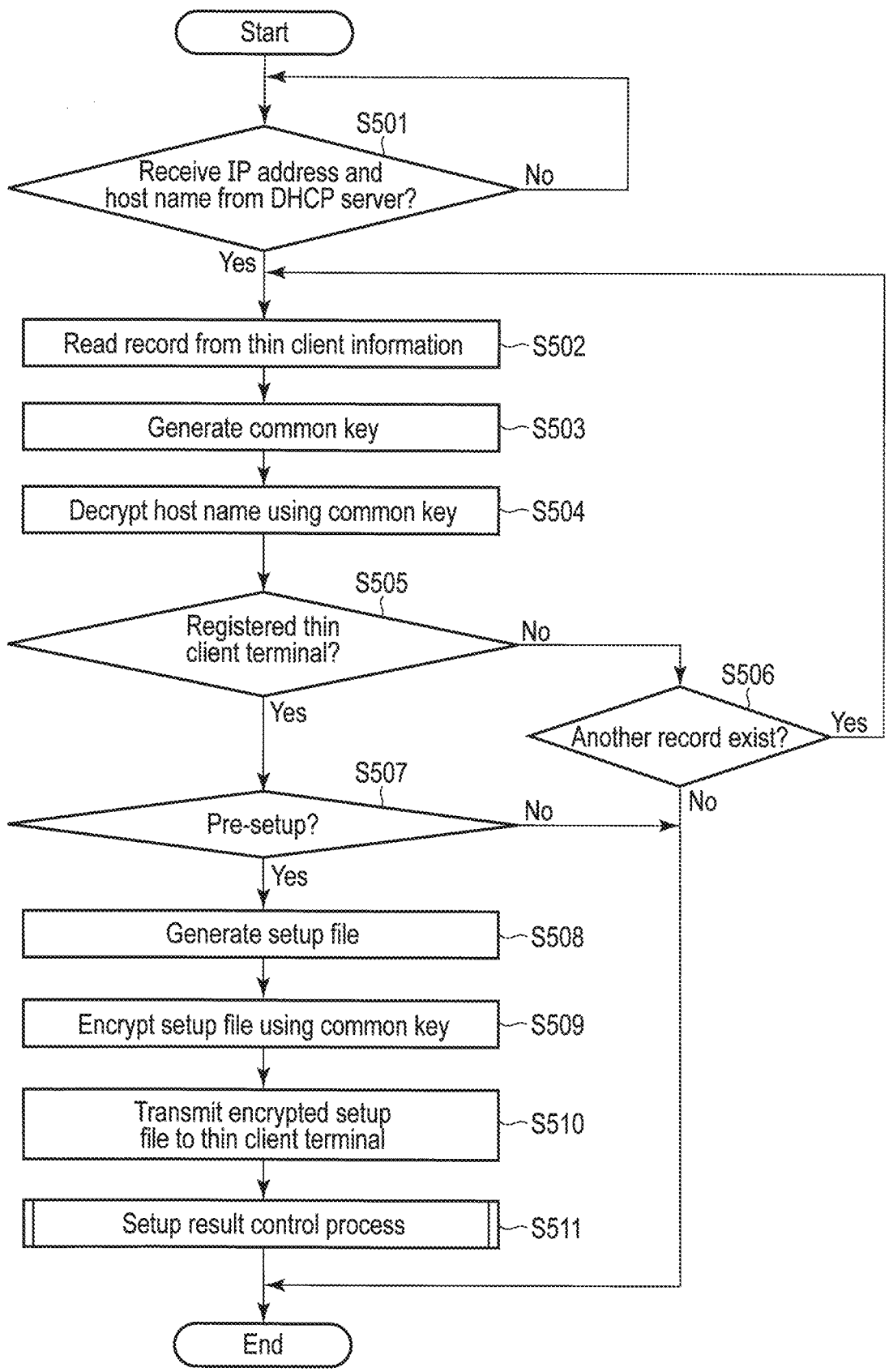
FIG. 10 is a flowchart showing an example of the procedure of a setup control process executed by a management server in the control system of the first embodiment.

An example of the procedure of a setup control process executed by the management server 2 will be explained with reference to a flowchart of FIG. 10.

The management server 2 determines whether an IP address and a host name have been received from the DHCP server 3 (step S501). Note that the management server 2 may determine whether a record of the lease information 35 including an IP address and a host name has been received. When an IP address and a host name have not been received (NO in step S501), the process returns to step S501, and whether an IP address and a host name have been received is determined again.

When an IP address and a host name have been received (YES in step S501), the management server 2 reads a record corresponding to a thin client terminal 1 from the thin client information 29B (step S502). The management server 2 generates a common key of the thin client terminal 1 using a value of the production number field in the read record (step S503). The generated common key may be stored into the database 29 or the like. If a common key has already been generated beforehand, or if a common key has already been generated in a setup control process for a different terminal, the common key of the thin client terminal 1 may be stored into the database 29 or the like. In that case, step S503 may be skipped. The management server 2 decrypts the received host name using the generated common key (step S504).

Then, the management server 2 determines whether the terminal corresponding to the decrypted host name is a thin client terminal 1 registered with the management server 2 using the decrypted host name and the information of the production number field in the read record (step S505). The management server 2 determines that the terminal corresponding to the decrypted host name is the thin client terminal 1 registered with the management server 2 when the decrypted host name and the information of the production number field in the read record match. On the other hand, the management server 2 determines that the terminal corresponding to the decrypted host name is a terminal which is not registered with the management server 2 when the decrypted host name and the information of the production number field in the read record do not match.

When the terminal corresponding to the decrypted host name is a terminal which is not registered with the management server 2 (NO in step S505), the management server 2 determines whether the thin client information 29B includes another record to be processed (step S506). When the thin client information 29B includes another record (YES in step S506), the process returns to step S502. That is, the received host name is decrypted using the another record, and whether the terminal of the decrypted host name is a thin client terminal 1 corresponding to the another record will be determined. On the other hand, when the thin client information 29B does not include any record to be processed (NO in step S506), that is, when steps S502 to S505 are performed for all of the records in the thin client information 29B, it means that the terminal of the received host name does not correspond to any thin client terminal 1 registered with the management server 2. Thus, the process ends.

When the terminal corresponding to the decrypted host name is a thin client terminal 1 registered with the management server 2 (YES in step S505), the management server 2 determines whether the thin client terminal 1 is in a pre-setup state using the information of the state field in the thin client information 29B (step S507). The management server 2 determines that the thin client terminal 1 is in the pre-setup state when the record includes the decrypted host name set in the production number field and includes "Pre-setup" set in the state field. The management server 2 may determine that the thin client terminal 1 is in a post-setup state when "Normal" or "Locked" is set in the state field of the record.

When the thin client terminal 1 is in a post-setup state (NO in step S507), the process ends.

Figure 11:
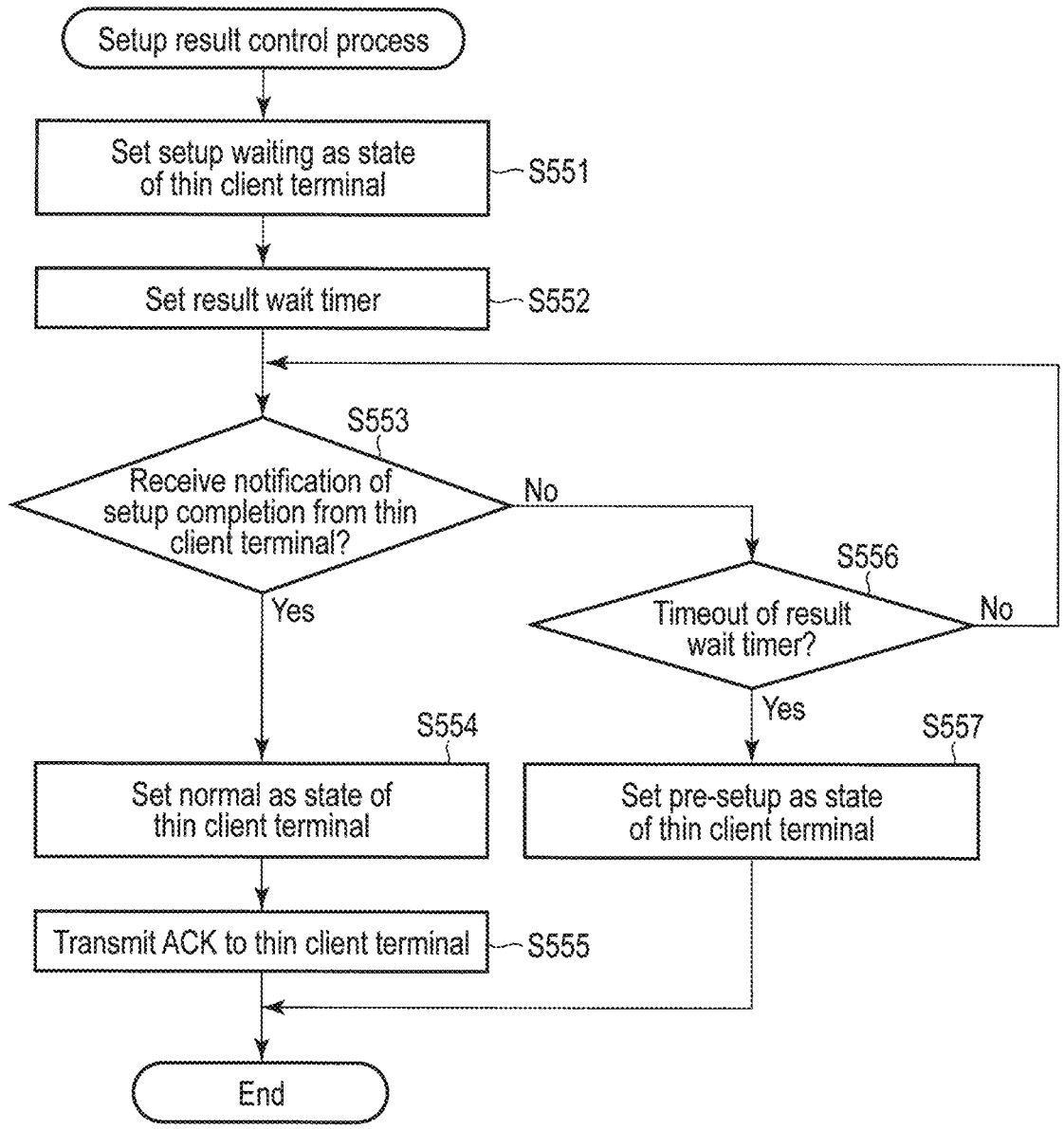
FIG. 11 is a flowchart showing an example of the procedure of a setup result control process in the setup control process of FIG. 10.

When the thin client terminal 1 is in a pre-setup state (YES in step S507), the management server 2 generates a setup file for the thin client terminal 1 using the setup information 29A (step S508). The management server 2 encrypts the generated setup file using the common key (step S509). Then, the management server 2 transmits the encrypted setup file to the thin client terminal 1 (step S510), and performs a setup result control process for processing a result of setup by the thin client terminal 1 (step S511). An example of the procedure of the setup result control process will be explained with reference to a flowchart of FIG. 11.

Firstly, the management server 2 sets "Setup waiting" indicative of a standby waiting for setup by the thin client terminal 1 in the state field of the record corresponding to the thin client terminal 1 in the thin client information 29B (step S551). Then, the management server 2 sets (starts) the result wait timer 211 (step S552).

Then, the management server 2 determines whether a notification of setup completion has been received from the thin client terminal 1 (step 553). When the notification of setup completion has been received (YES in step S553), the management server 2 sets "Normal" as the state of thin client terminal 1 (step S554). That is, the management server 2 sets "Normal" in the state field of the record corresponding to the thin client terminal 1 in the thin client information 29B. Then, the management server 2 transmits ACK to the thin client terminal 1 (step S555) and ends the process.

On the other hand, when the notification of setup completion has not been received (NO in step S553), the management server 2 determines whether the result wait timer 211 has detected a timeout (step S556). When the result wait timer 211 has not detected a timeout (NO in step S556), the process returns to step S553, and a process of standby waiting for the notification of setup completion from the thin client terminal 1 is continued.

When the result wait timer 211 has detected a timeout (YES in step S556), the management server 2 sets "Pre-setup" as the state of thin client terminal 1 (step S557) and ends the process. That is, the management server 2 sets "Pre-setup" in the state field of the record corresponding to the thin client terminal 1 in the thin client information 29B.

With the above-described configuration, the management server 2 receives an IP address and a host name of a terminal requesting the DHCP server 3 to lease an IP address from the DHCP server 3 and determines whether the terminal is a thin client terminal 1 registered with the management server 2 and is in a pre-setup state. Then, when the terminal is a thin client terminal 1 registered with the management server 2 and is in a pre-setup state, the management server 2 can cause the thin client terminal 1 to perform setup by transmitting a setup file to the thin client terminal 1. Since information including a URL of the management server 2 and a file name of a setup file is not required to be set to the thin client terminal 1 beforehand, workload for setup of the thin client terminal 1 can be reduced.

Note that the management server 2 may determine whether the lease information 35 has been received from the DHCP server 3 in step S501. In that case, the management server 2 detects, from records in the newly received lease information 35, records that have been updated from the records in the lease information 35 received from the DHCP server 3 at the last transmission. Then, the management server 2 performs steps S502 and thereafter using an IP address and a host name included in each record detected. Thus, a similar setup control process can be performed if the lease information 35 is received as it is from the DHCP server 3.

Figure 12:
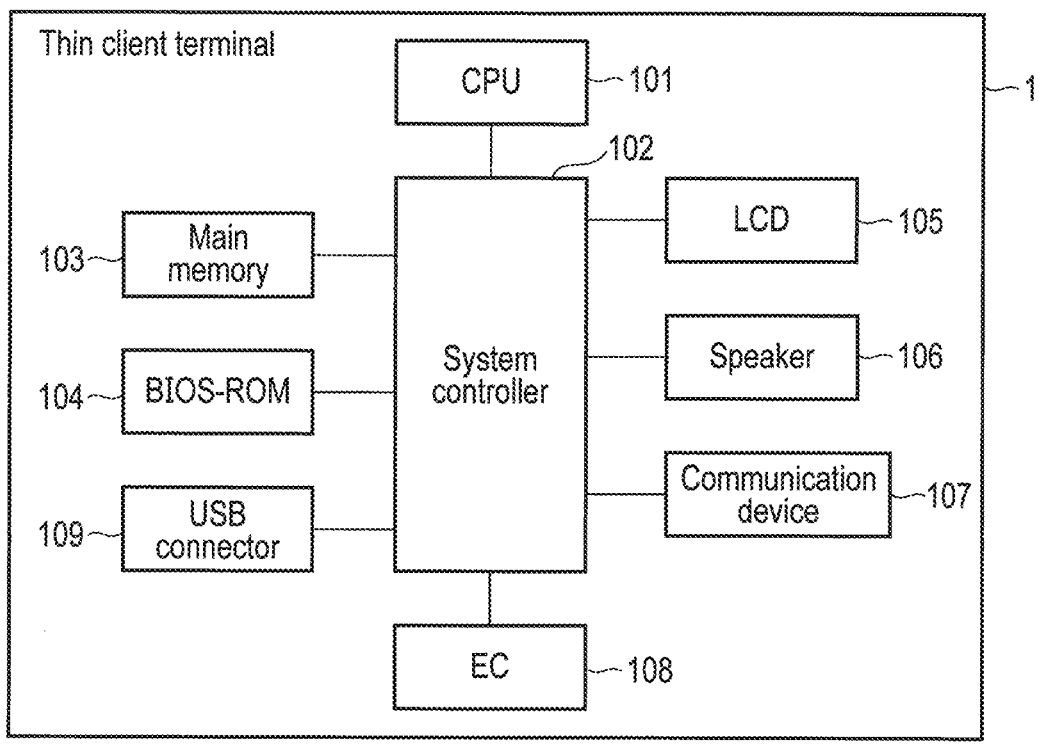
FIG. 12 is a block diagram showing an example of a system configuration of the thin client terminal in the control system of the first embodiment.

FIG. 12 shows an example of a system configuration of the thin client terminal 1.

The thin client terminal 1 includes a CPU 101, a system controller 102, a main memory 103, a BIOS-ROM 104, an LCD 105, a speaker 106, a communication device 107, an embedded controller (EC) 108, and a USB connector 109.

The CPU 101 is a processor that executes a BIOS and an embedded OS stored in the BIOS-ROM 104, various programs downloaded in the main memory 103, and the like.

The system controller 102 is a bridge device connecting between the CPU 101 and each component. The system controller 102 controls data transfer with various devices that are connected to the USB connector 109. The device is, for example, a USB flash memory. In that case, the system controller 102 controls write/read of data to/from the USB flash memory.

Furthermore, the system controller 102 includes a display controller that controls the LCD 105 used as a display monitor of the thin client terminal 1. The display signal generated by the display controller is sent to the LCD 105. The LCD 105 displays a screen image based on the display signal. On the screen of the LCD 105, information may be displayed in accordance with the state of the thin client terminal 1 and an operation by a user.

The system controller 102 further includes an audio controller that controls the speaker 106. The audio signal generated by the audio controller is sent to the speaker 106. The speaker 106 outputs a sound based on the audio signal.

The communication device 107 performs wired or wireless communication. The communication device 107 includes a transmitter that transmits signals and a receiver that receives signals. The EC 108 functions as a power controller that executes power management to turn on or off the client terminal 1.

Figure 13:
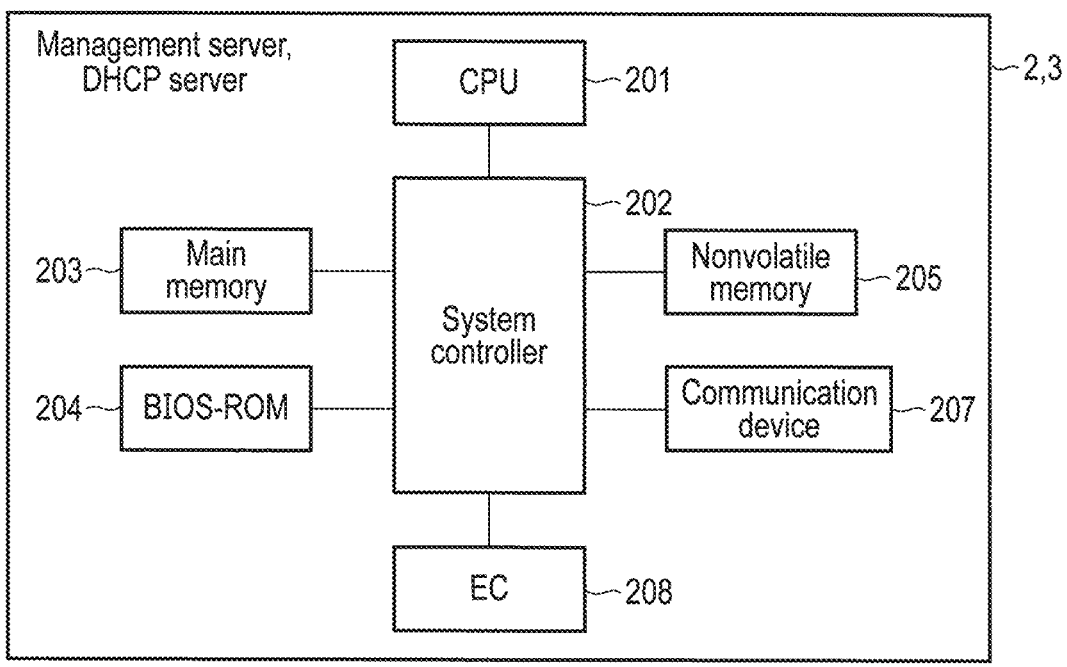
FIG. 13 is a block diagram showing an example of a system configuration of the management server and the DHCP server in the control system of the first embodiment.

FIG. 13 shows an example of the system configuration of the management server 2 and the DHCP server 3.

Each of the servers 2 and 3 includes a CPU 201, a system controller 202, a main memory 203, a BIOS-ROM 204, a nonvolatile memory 205, a communication device 207, and an embedded controller (EC) 208.

The CPU 201 is a processor that executes a BIOS stored in the BIOS-ROM 204, an OS and various programs loaded from the nonvolatile memory 205 to the main memory 203, and the like. Data used in each of the servers 2 and 3 may be stored into the nonvolatile memory 205. For example, in the management server 2, a part of the storage area of the nonvolatile memory 205 is used as a database 29 in which the setup information 29A and the thin client information 29B may be stored. Furthermore, in the DHCP server 3, the lease information 35 may be stored into the nonvolatile memory 205.

The system controller 202 is a bridge device connecting between the CPU 201 and each component.

The communication device 207 performs wired or wireless communication. The communication device 207 includes a transmitter that transmits signals and a receiver that receives signals. The EC 208 functions as a power controller that executes power management to turn on or off each of the servers 2 and 3.

As explained above, according to the embodiment, workload for setup can be reduced. The thin client terminal 1 transmits a request for assignment of an IP address to the DHCP server 3. The request for assignment includes first identification information (for example, a production number, an encrypted production number, or the like) that uniquely identifies the thin client terminal 1 and is set as a first host name. In accordance with the request for assignment, the DHCP server 3 assigns a first IP address to the thin client terminal 1 and transmits the first IP address and the first host name of the thin client terminal 1 to the management server 2. In the management server 2, one or more items of second identification information that uniquely identify each of one or more client terminals to which setup should be performed are stored into the database 29 (nonvolatile memory 205). The management server 2 receives the first IP address and the first host name from the DHCP server 3. When the one or more items of second identification information include the first identification information set as the first host name, and when setup of the thin client terminal 1 corresponding to the first identification information has not been performed, the management server 2 transmits data for setup to the thin client terminal 1 using the first IP address.

In the thin client terminal 1, setup is performed using the transmitted data for setup. Thus, a URL of the management server 2 and a file name of the data for setup are not required to be set into the thin client terminal 1 or the DHCP server 3 beforehand, and thus, workload for setup can be reduced.

Second Embodiment

The first embodiment discloses a configuration for setup of setting information of a thin client terminal 1. In the second embodiment, a configuration for updating setting information set to the thin client terminal 1 will be explained.

A control system 1 of the second embodiment is the same as the control system 1 of the first embodiment, and only the procedure of updating the setting information performed by the thin client terminal 1, the management server 2, and the management console 5 is different from the first embodiment. Hereinafter, differences from the first embodiment will be mainly explained.

A manager may need to update the setting information set to the thin client terminal 1 (in the setup, for example) to conform to various changes with respect to the thin client terminal 1 or the management server 2. The changes may be, for example, changes to a user, a hardware configuration, a software configuration, a using environment, a usage, or the like related to the thin client terminal 1 and/or the management server 2.

Figure 14:
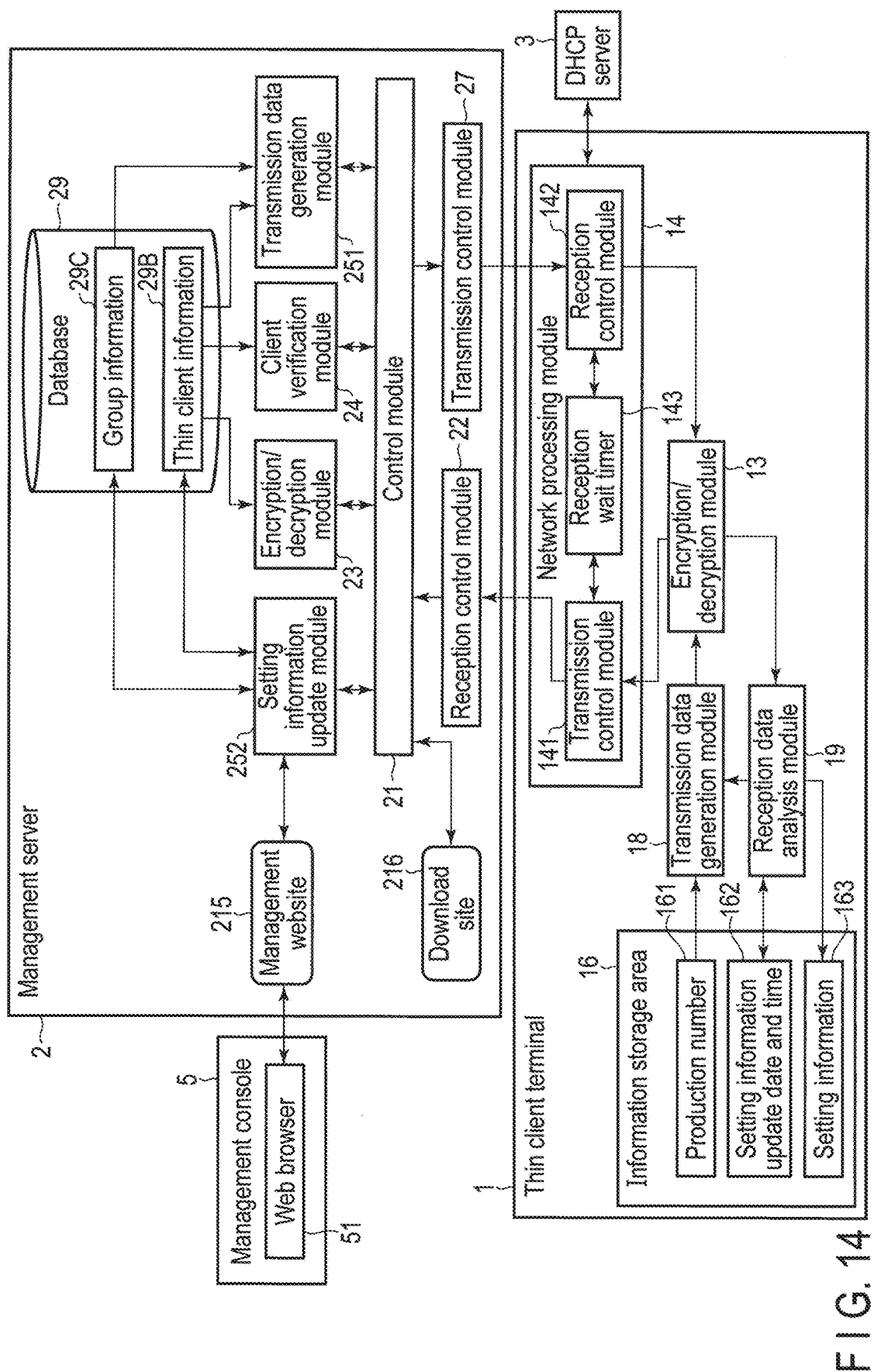
FIG. 14 is an exemplary block diagram showing a functional configuration of a control system according to a second embodiment.

In the present embodiment, as shown in FIG. 14, the management server 2 can update setting information 163 set to the thin client terminal 1 in accordance with an operation by the manager using the management console 5. New setting information to update the setting information 163 is created using thin client information 29B used for managing information set to each thin client terminal 1 and group information 29C used for managing information set to each group to which the thin client terminal 1 belongs. The management server 2 distributes the created setting information to the thin client terminal 1. The thin client terminal 1 replaces the setting information 163 as being set (in the setup, for example) with the distributed setting information to update the setting information 163.

Specifically, the thin client terminal 1 stores the setting information 163 and a setting information update date and time 162 that are included in first data transmitted by the management server 2, in an information storage area 16. The setting information update date and time 162 indicates a first date and time of when the management server 2 generates the setting information 163. The first data is used for, for example, setup. The data for setup is described in the first embodiment.

When the thin client terminal 1 is booted (turned on, for example) after the setting information 163 and the setting information update date and time 162 indicative of the first date and time are stored in the information storage area 16, the thin client terminal 1 transmits second data to the management server 2. The second data includes a transmission request of a second date and time of when the management server 2 updates the setting information. In the management server 2, the update of the setting information to be distributed to the thin client terminal 1 is, for example, performed in accordance with an operation via the management console 5. The management server 2 transmits, when the second data is received from the thin client terminal 1, third data including the second date and time to the thin client terminal 1.

The thin client terminal 1 receives the third data from the management server 2. When the second date and time included in the third data is different from the first date and time indicated by the setting information update date and time 162, the thin client terminal 1 transmits fourth data including a transmission request of updated setting information to the management server 2. The management server 2 transmits, when the fourth data is received form the thin client terminal 1, fifth data including the updated setting information to the thin client terminal 1.

The thin client terminal 1 receives the fifth data from the management server 2, updates the setting information 163 stored in the information storage area 16 with the updated setting information included in the fifth data, and updates the setting information update date and time 162 stored in the information storage area 16 with the second date and time. Thus, the manager can easily update the setting information 163 set to the thin client terminal 1.

Now, a functional configuration of the thin client terminal 1, the management server 2, and the management console 5 will be explained.

As shown in FIG. 14, the management server 2 includes a control module 21, a transmission control module 27, an encryption/decryption module 23, a client verification module 24, a transmission data generation module 251, a setting information update module 252, a reception control module 22, and a database 29. The database 29 stores thin client information 29B including information set to each thin client terminal 1 and group information 29C including information set to a group to which one or more thin client terminals 1 belong. The management server 2 further includes a management website 215 that processes a web access by the management console 5 and a download site 216 that processes a download request of a file by the thin client terminal 1.

The control module 21 controls operations of each component in the management server 2. The control module 21 may receive data transmitted from the thin client terminal 1 via the reception control module 22. The control module 21 may transmit data to the thin client terminal 1 via the transmission control module 27. The reception control module 22 and the transmission control module 27 communicate with the thin client terminal 1 through, for example, a communication procedure based on HTTP or HTTPS.

The encryption/decryption module 23 may encrypt data to be transmitted to the thin client terminal 1 and decrypt data encrypted by the thin client terminal 1, by using a common key of the thin client terminal 1. The encryption/decryption system used here may be AES256 or the like.

The client verification module 24 verifies whether a terminal is one of the thin client terminals 1 registered with the management server 2 using the thin client information 29B.

FIG. 15 shows a configuration example of the thin client information 29B. The thin client information 29B includes one or more records corresponding to one or more thin client terminals 1 managed by the management server 2. That is, the one or more thin client terminals 1 are registered with the management server 2.

Each record includes, for example, fields of a production number, a computer name, a group name, a state, an identifier, a user certificate (client certificate), a private key, a private password, a common key, and an update date and time.

In a record corresponding to a thin client terminal 1, a production number field shows identification information indicative of a production number uniquely assigned for managing the thin client terminal 1. Thus, the management server 2 uniquely identifies each of the thin client terminals 1, based on the production number assigned thereto. Note that, instead of the production number, a different value that can uniquely identify the thin client terminal 1 (for example, a physical address such as MAC address) may be used.

A computer name field indicates a computer name given to the thin client terminal 1. The computer name is given by the management server 2 at the time of setup of the thin client terminal 1, for example. The computer name may be used as a host name when the thin client terminal 1 connects to a network. For example, when the thin client terminal 1 that has been subjected to the setup requests the DHCP server 3 to lease an IP address, the computer name is used as a host name.

A group name field indicates a group name to which the thin client terminal 1 belongs. Using a value set in the group name field, the record in the group information 29C including information to be set to the thin client terminal 1 is identified. A configuration of the group information 29C will be described later with reference to FIG. 16.

A state field shows state information indicative of a state of the thin client terminal 1. In the state field, for example, any of "Pre-setup", "Normal", and "Locked" is set. The "Pre-setup" indicates that the thin client terminal has not been subjected to the setup (initial setting). The "Normal" indicates that the thin client terminal 1 has been subjected to the setup and the thin client terminal 1 operates properly. The "Locked" indicates that the management server 2 prohibits the thin client terminal 1 from being booted.

An identifier field, a user certificate field, a private key field, and a private password field indicate information related to security setting of wireless local area network (LAN) connection (or wired LAN connection). The identifier field indicates an identifier used in authentication (for example, EAP-TLS authentication) when the thin client terminal 1 connects to wireless LAN.

The user certificate field indicates an electronic certificate used in the authentication. In the user certificate field, a file name of a file including an electronic certificate used in the authentication is set, for example. The file of electronic certificate is stored into the database 29, for example. The file of the electronic certificate includes information indicative of the date and time of when the file is created or updated.

The private key field indicates a key used in the authentication. In the private key field, a file name of a file including a key used for the authentication is set, for example. The file of the key is stored into the database 29, for example. The file of the key includes information indicative of the date and time of when the file is created or updated.

The private password field indicates a password used in the authentication.

The information in the identifier field, the user certificate field, the private key field, and the private password field may be used in login to a VDI server 4 or the like.

A common key field indicates a common key used in data exchange between the thin client terminal 1 and the management server 2. That is, the common key is used in encryption and decryption of data by the thin client terminal 1, and in encryption and decryption of data by the management server 2.

An update date and time field shows an update date and time of when the management server 2 updates (or creates) setting information to be set to the thin client terminal 1. The update date and time indicates, for example, an update date and time of a record in thin client information 29B corresponding to the thin client terminal 1 or of a record in the group information 29C corresponding to a group to which the thin client terminal 1 belongs. Based on the update date and time, whether the setting information 163 currently being set to the thin client terminal 1 is latest may be determined.

FIG. 16 shows a configuration example of group information 29C. The group information 29C includes one or more records corresponding to one or more groups managed by the management server 2. One or more thin client terminals 1 belong to each group.

Each record includes, for example, fields of a group name, a management server URL, a download server URL, a VDI server URL, a BIOS setting kitting file name, a number of retry, a retry interval, a polling interval, an action upon disconnection, and a domain.

In a record corresponding to a group, a group name field indicates a name given to the group. In the group name field, a name that uniquely identifies the group is set.

A management server URL field indicates an address on a network used by a thin client terminal 1 of the group to access the management server 2 that manages the thin client terminal 1.

A download server URL field indicates an address on a network used by a thin client terminal of the group to access a download server. In the download server URL field, for example, an URL to access the download site 216 on the management server 2 is set. By accessing the management server 2 with the URL set in the download server URL field and the file name of the file arranged in the management server 2 (download site 216), the file with the file name can be downloaded from the management server 2.

A VDI server URL field indicates an address on the network to access the VDI server 4 after a thin client terminal 1 of the group is booted properly.

A BIOS setting kitting file name field indicates a file name of a file to set basic input/output system (BIOS) of a thin client terminal 1 of the group. The file for the BIOS setting is, for example, stored into the database 29. The file to set BIOS includes information indicative of a date and time of when the file is created or updated.

A number of retry field, a retry interval field, a polling interval filed, an action upon disconnection field, and a domain field indicate information related to communication setting.

A number of retry field indicates an upper limit number of polling retries (for example, ten times) by a thin client terminal 1 of the group performed when the management server 2 does not respond to a polling by the thin client terminal 1. A retry interval field indicates an interval between polling retries to the management server 2 by a thin client terminal 1 of the group (for example, thirty seconds). A polling interval field indicates an interval between polling operations to the management server 2 performed by a thin client terminal 1 of the group (for example, ten seconds).

An action upon disconnection field indicates an action by a thin client terminal 1 of the group performed when the thin client terminal 1 retries polling by the number of retry. The action may be, for example, power off or screen lock. In the screen lock state, the thin client terminal does not accept any operation. In the power off state and the screen lock state, an illegal usage of the thin client terminal 1 can be prevented.

A domain field indicates a domain name of the group on a network. With the domain name indicated in the domain field, each thin client terminal 1 of the group is managed.

The management server 2 updates at least one of the thin client information 29B or the group information 29C in accordance with an operation of the manager using the management console 5. In the following description, the operations of the management server 2 and the management console 5 to update the thin client information 29B and the group information 29C will be explained.

The management website 215 is a website that provides an interface to update the thin client information 29B and the group information 29C with the manager. The management website 215 generates a webpage to update at least one of the thin client information 29B or the group information 29C in cooperation with the setting information update module 252. The management console 5 accesses the management website 215 in response to the operation by the manager.

The management console 5 is a terminal operated by a manager and may be realized as a personal computer, for example. The management console 5 has a function to communicate with the management server 2 through a network.

For example, a web browser 51 executing on the management console 5 realizes an access to the management website 215 on the management server 2. That is, when the manager performs an operation to execute the web browser 51 on the management console 5 and performs an operation to access the management website 215 using the web browser 51, the management console 5 can be connected to the management website 215.

The web browser 51 receives, for example, data of a web page to update at least one of the thin client information 29B or the group information 29C from the management website 215, and displays the web page on a screen. In accordance with an operation on the web page to change at least a part of the thin client information 29B and the group information 29C, the web browser 51 transmits data indicative of the changed content to the management website 215.

By using the data indicative of the changed content, the management website 215 updates at least one of the thin client information 29B or the group information 29C in cooperation with the setting information update module 252.

An example of an interface to update the thin client information 29B and the group information 29C will be explained with reference to FIGS. 17 and 18.

Figure 17:
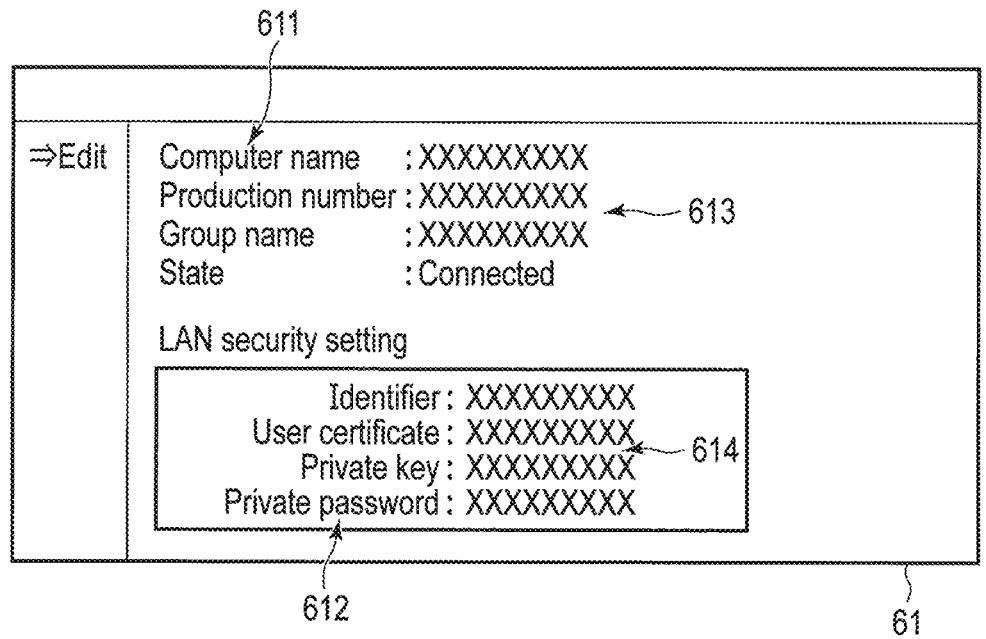
FIG. 17 shows an example of a setting screen of the thin client information displayed on a management console in the control system of the second embodiment.

FIG. 17 shows an example of a web page 61 to edit the thin client information 29B of each thin client terminal 1, displayed on a screen of the management console 5. A manager operates the management console 5 to execute the web browser 51, for example. Then, the manager operates the web browser 51 to access a specific address (URL) in the management website 215.

The specific address is an address of a web page to edit a record of the thin client information 29B corresponding to a thin client terminal 1. In response to an access to the specific address, the management server 2 transmits data of a web page corresponding to the address to the management console 5. Thus, in a window of the web browser 51, the web page 61 to edit the record of the thin client information 29B corresponding to the thin client terminal 1 is displayed.

The web page 61 includes, in order to edit a record of the thin client information 29B corresponding to a chin client terminal 1, display areas 611 and 612 corresponding to fields comprising the record, and text input areas 613 and 614 showing values set in the fields. A manager may perform an operation to change a value shown in each of the text input areas 613 and 614. Note that, values currently being set in the fields in the record of the thin client information 29B stored in the management server 2 are displayed in the text input areas 613 and 614 in a condition before being changed by the manager.

Specifically, the display areas 611 include display areas of a computer name, a production number, a group name, and a state. The text input areas 613 show values to be set as the computer name, the production number, the group name, and the state, respectively.

The display areas 612 include display areas of an identifier, a user certificate, a private key, and a private password that are related to LAN security setting. The text input areas 614 show values to be set as the identifier, the user certificate, the private key, and the private password, respectively.

With the display areas 611 and 612, and with the text input areas 613 and 614, the manager can check the values set in the fields and can perform an operation to change each of the values. The value changed by the operation is transmitted from the management console 5 to the management server 2, and is reflected upon the corresponding record of the thin client information 29B. Thus, the manager can freely change the record of the thin client information 29B corresponding to each thin client terminal 1 by the operation using the web page 61.

Figure 18:
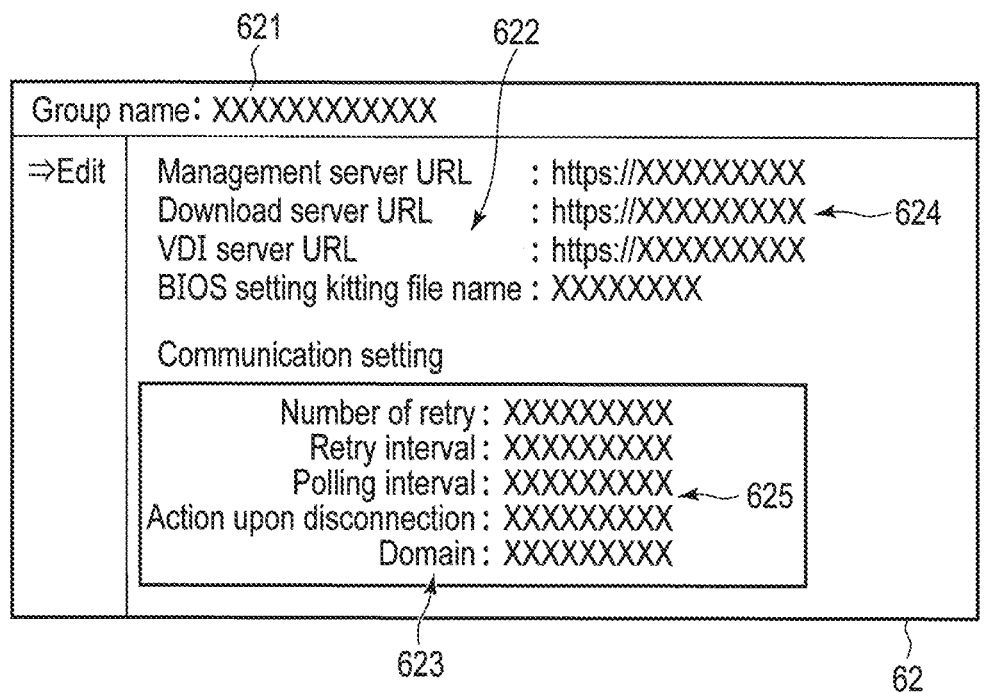
FIG. 18 shows an example of a setting screen of the group information displayed on the management console in the control system of the second embodiment.

FIG. 18 shows an example of a web page 62 to edit group information 29C of each group displayed on a screen of the management console 5. The manager operates the management console 5 to execute the web browser 51 on the management console 5, for example. Then, the manager operates the web browser 51 to access a specific address (URL) in the management website 215.

The specific address is an address of a web page to edit a record of the group information 29C corresponding to a group. In response to an access to the specific address, the management server 2 transmits data of a web page corresponding to the address to the management console 5. Thus, in a window of the web browser 51, the web page 62 to edit the record of the group information 29C corresponding to the group is displayed.

The web page 62 includes, in order to edit a record of the group information 29C corresponding to a group, a display area 621 showing a name of the group, display areas 622 and 623 corresponding to fields in the record, and text input areas 624 and 625 showing values set in the fields. A manager may perform an operation to change a value shown in each of the text input areas 624 and 625. Note that, values currently being set in the fields in the record of the group information 29C stored in the management server 2 are displayed in the text input areas 624 and 625 in a condition before being changed by the manager.

Specifically, the display areas 622 include display areas of a management server URL, a download server URL, a VDI server URL, and a BIOS setting kitting file name. The text input areas 624 show values to be set as the management server URL, the download server URL, the VDI server URL, and the BIOS setting kitting file name, respectively.

The display areas 623 include display areas for the number of retry, a retry interval, a polling interval, an action upon disconnection, and a domain that are related to communication setting. The text input areas 625 show values set as the number of retry, the retry interval, the polling interval, the action upon disconnection, and the domain, respectively.

With the display areas 622 and 623, and with the text input areas 624 and 625, the manager can check the values set in the fields and can perform an operation to change each of the values. The value changed by the operation is transmitted from the management console 5 to the management server 2, and is reflected upon the corresponding record of the group information 29C. Thus, the manager can freely change the record of the group information 29C corresponding to each group by the operation using the web page 62.

As above, the web browser 51 of the management console 5 transmits the contents of operations using the web pages 61 and 62 to the management website 215. That is, a changed content of a record of the thin client information 29B using the web page 61 and a changed content of a record of the group information 29C using the web page 62 are transmitted from the web browser 51 to the management website 215.

The setting information update module 252 of the management server 2 updates the record of the thin client information 29B and the record of the group information 29C using the changed contents sent to the management website 215. Thus, the manager can easily edit the record of the thin client information 29B or the record of the group information 29C by an operation via the management console 5.

Furthermore, when a record of the thin client information 29B is updated, the setting information update module 252 updates the date and time set in an update date and time field in the record to the date and time of when the update is performed. In the example of FIG. 15, when updating at least one field in a record that is included in the thin client information 29B and includes "XXX001" set in the production number field, the update date and time field in the record is changed from "2018/5/16 10:00" to the date and time of when the update is performed.

Furthermore, when a record in the group information 29C is updated, the setting information update module 252 specifies a thin client terminal 1 that belongs to a group corresponding to the record. Then, in the record of the thin client information 29B corresponding to the specified thin client terminal 1, the setting information update module 252 updates the date and time set in the update date and time field to a date and time of when the record of the group information 29C is updated.

In the example of FIGS. 15 and 16, when a record of the group information 29C including "group1" set in the group name field is updated, thin client terminals 1 that belong to "group 1" are specified by using the thin client information 29B. One of the specified thin client terminals 1 corresponds to a first record of the thin client information 29B including "group 1" set in the group name field and "XXX001" set in the production number field. The other of the specified thin client terminals 1 corresponds to a second record of the thin client information 29B including "group 1" set in the group name field and "XXX002" set in the production number field. Then, in each of the first and second records, the date and time set in the update date and time is changed to a date and time of when the record of the group information 29C including "group1" set in the group name field is updated.

The management server 2 distributes the setting information generated by using the updated thin client information 29B and the updated group information 29C to the thin client terminal 1. The thin client terminal 1 updates the setting information 163 by replacing the setting information 163 currently being set (by, for example, setup) with the distributed setting information.

Operations of the thin client terminal 1 and the management server 2 to update the setting information 163 in the thin client terminal 1 will be explained. Here, assume that the setting information 163 and the setting information update date and time 162 that indicates a first date and time of when the management server 2 generates the setting information 163, are stored into the information storage area 16 in the thin client terminal 1 using the first data (for example, data for setup) transmitted from the management server 2.

The control module 21 receives second data requesting transmission of an update date and time of setting information from the thin client terminal 1 through the reception control module 22. The encryption/decryption module 23 and the client verification module 24 determine whether the terminal transmitting the second data is a thin client terminal 1 registered with the management server 2, by using the thin client information 29B and a production number included in the second data. That is, whether a terminal that has the production number included in the second data is a thin client terminal 1 registered with the management server 2, is determined. The client verification module 24 notifies the control module 21 of a verification result as to whether the terminal transmitting the second data is a thin client terminal 1 registered with the management server 2.

Specifically, the encryption/decryption module 23 and the client verification module 24 read a record from the thin client information 29B. The encryption/decryption module 23 decrypts the received second data using a common key in the record. Then, the client verification module 24 determines that the terminal receiving the second data is a thin client terminal 1 registered with the management server 2 when a production number in the record and a production number in the decrypted second data match.

On the other hand, when a production number in the record and a production number in the decrypted second data do not match, a different record is read from the thin client information 29B, and whether the terminal transmitting the second data is a thin client terminal 1 registered with the management server 2 is determined using the different record. Then, when the production numbers in all records in the thin client information 29B do not match with the production number in the decrypted second data, the client verification module 24 determines that the terminal transmitting the second data is not a thin client terminal 1 registered with the management server 2. In that case, the management server 2 discards the second data and does not respond to the terminal transmitting the second data at all, for example.

When a verification result notified by the client verification module 24 indicates that the terminal transmitting the second data is a thin client terminal 1 registered with the management server 2, and when the decrypted second data includes a transmission request of a setting information update date and time, the control module 21 instructs the transmission data generation module 251 to generate third data. The third data includes an update date and time of setting information to be distributed to the thin client terminal 1.

The transmission data generation module 251 acquires an update date and time from the record of the thin client information 29B corresponding to the thin client terminal 1, and generates third data including the acquired update date and time. The encryption/decryption module 23 encrypts the third data using a common key included in the record. The control module 21 transmits the encrypted third data to the thin client terminal 1 through the transmission control module 27.

Then, the control module 21 receives fourth data for requesting transmission of setting information from the thin client terminal 1 through the reception control module 22. The encryption/decryption module 23 and the client verification module 24 determine whether a terminal transmitting the fourth data is a thin client terminal 1 registered with the management server 2, by using the thin client information 29B and a production number included in the fourth data. That is, whether the terminal that has the production number included in the fourth data is a thin client terminal 1 registered with the management server 2, is determined. The client verification module 24 notifies the control module 21 of a verification result as to whether the terminal transmitting the fourth data is a thin client terminal 1 registered with the management server 2. Details of a verification method are similar to the above-described verification method performed when the second data is received.

When the verification result notified by the client verification module 24 indicates that the terminal transmitting the fourth data is a thin client terminal 1 registered with the management server 2, and when the decrypted fourth data includes a transmission request of setting information, the control module 21 instructs the transmission data generation module 251 to generate fifth data. The fifth data includes setting information to be distributed to the thin client terminal 1.

The transmission data generation module 251 generates fifth data including the setting information, by using a record in the thin client information 29B corresponding to the thin client terminal 1 and a record in the group information 29C corresponding to a group to which the thin client terminal 1 belongs. Specifically, the transmission data generation module 251 reads, for example, a first record corresponding to the production number of the thin client terminal 1 from the thin client information 29B stored in the database 29. Based on a group name included in the read first record, the transmission data generation module 261 reads a second record corresponding to the group name from the group information 29C stored in the database 29. The transmission data generation module 251 generates the fifth data including the setting information using the first and second records. Thus, the setting information transmitted to the thin client terminal 1 may include at least a part of data included in the first record of the thin client information 29B and at least a part of data included in the second record of the group information 29C.

FIG. 19 shows a configuration example of the fifth data including setting information 71 transmitted from the management server 2 to a thin client terminal 1. The fifth data is, for example, XML-format data.

As described above, the transmission data generation module 251 generates the setting information 71, by using the first record of the thin client information 29B corresponding to the thin client terminal 1 as a transmission destination and the second record of the group information 29C corresponding to the group to which the thin client terminal 1 belongs. Thus, the setting information 71 includes information obtained from the first and second records.

Specifically, the setting information 71 includes first information obtained from the first record of the thin client information 29B. The first information includes a computer name, and an identifier, a user certificate (including update date and time thereof), a private key (including update date and time thereof) and a private password that are related to LAN security setting. The setting information 71 further includes second information obtained from the second record of the group information 29C. The second information includes a management server URL, a download server URL, a VDI server URL, a BIOS setting kitting file (including an update date and time thereof), and the number of retry, a retry interval, a polling interval, an action upon disconnection and a domain that are related to communication setting.

In the setting information 71, the above-mentioned information is included in the following data formats.

(1) Computer name: Text
(2) Identifier of LAN security setting: Text
(3-1) File name of user certificate of LAN security setting: Text
(3-2) Update date and time of user certificate of LAN security setting: Date
(3-3) Body of file of user certificate of LAN security setting: Base64
(4-1) File name of private key of LAN security setting: Text
(4-2) Update date and time of private key of LAN security setting: Date
(4-3) Body of file of private key of LAN security setting (that is, data of file): Base64
(5) Private password of LAN security setting: Text
(6) Management server URL: Text
(7) Download server URL: Text
(8) VDI server URL: Text
(9-1) File name of BIOS setting kitting file: Text
(9-2) Update date and time of BIOS setting kitting file: Date
(9-3) Body of BIOS setting kitting file: Base64
(10) Number of retry of communication setting: Text
(11) Retry interval of communication setting: Text
(12) Polling interval of communication setting: Text
(13) Action upon disconnection of communication setting: Text
(14) Domain of communication setting: Text
(15) Update date and time: Date Note that Text format data includes one or more character codes. Date format data includes a value indicative of a date, or a value indicative of a date and time. Base64 format data includes one or more ASCII codes obtained by converting binary data of a file. These data formats above are examples, and may be changed to any formats capable of transmitting each data above.

FIG. 20 shows a configuration example of BIOS setting kitting file 72 included in the setting information 71. The BIOS setting kitting file 72 is used for BIOS setting of a thin client terminal 1 that belongs to a group associated with the BIOS setting kitting file 72.

The BIOS setting kitting file 72 includes, for example, a language setting, a keyboard setting, a time zone, a priority band of wireless LAN (for example, Wi-Fi), an aggressiveness of wireless LAN roaming, a network mode, an SSID for priority connection of wireless LAN, an authentication method for priority connection of wireless LAN, a user name for priority connection of wireless LAN, and a password for priority connection of wireless LAN.

The language setting indicates a language used in the thin client terminal 1. One language selected from, for example, Japanese, English, and German is set as the data. The thin client terminal 1 may display characters that are available in a mode of the set language, on the screen.

The keyboard setting indicates a language supported by a keyboard that is included in or connected to the thin client terminal 1. One language selected from, for example, Japanese, English, and German is set as the data.

The time zone indicates a time zone of a location where the thin client terminal 1 is used. The time zone corresponds to a region having the same standard time. A name of country or city representing the region of a certain standard time (such as Asia/Tokyo, America/New York, or Europe/London) may be set as the data. Alternatively, a time differential from a coordinated universal time (UTC) of a certain region (for example, UTC+09:00, UTC−04:00, or the like) may be set as the data.

The priority band of wireless LAN indicates a frequency band of wireless LAN to which the thin client terminal 1 should be connected first. For example, one of "Non" indicative of no frequency band to be selected, "5.2 GHz" indicative of a frequency band of 5.2 GHz, and "2.4 GHz" indicative of a frequency band of 2.4 GHz is set as the priority band of wireless LAN.

The aggressiveness of wireless LAN roaming indicates an index of aggressiveness when the thin client terminal 1 performs roaming of wireless LAN. For example, one of "Low" indicative of a low aggressiveness, "Medium" indicative of a middle aggressiveness, and "High" indicative of a high aggressiveness is set as the data.

The network mode indicates a mode of network used by the thin client terminal 1. For example, one of "Auto" indicative of automatic selection of a network to be connected, "Wired" indicative of a wired network, and "WiFi" indicative of a wireless network is set as the data.

The SSID for priority connection of wireless LAN indicates an SSID of an access point where the thin client terminal 1 is connected. A character string indicating the SSID is set as the data.

The authentication method for priority connection of wireless LAN indicates an authentication method used by the thin client terminal 1 for the wireless LAN connection. For example, one of the authentication methods of WEP and WPA-Enterprise (PEAP/TLS) is set as the authentication method for priority connection of wireless LAN.

The user name for priority connection of wireless LAN indicates a user name used by the thin client terminal 1 for the wireless LAN connection. A character string indicating the user name is set as the user name for priority connection of wireless LAN.

The password for priority connection of wireless LAN connection indicates a password used by the thin client terminal 1 for the wireless LAN connection. A character string indicating the password is set as the password for priority connection of wireless LAN.

With the BIOS setting kitting file 72 configured as above, various parameters used by BIOS of each thin client terminal 1 may be set or updated.

The above settings using the BIOS setting kitting file 72 may be managed by, instead of BIOS, an operating system (OS) such as Windows (registered trademark) in a conventional personal computer. As compared to an OS executed on the conventional personal computer, the OS executed on the thin client terminal 1 may have limited functions and may not have a function to manage the above settings. Thus, a function to manage the above settings using the BIOS setting kitting file 72 is provided with the BIOS on the thin client terminal 1.

The transmission data generation module 251 generates fifth data including the setting information 71 with the configuration described above with reference to FIGS. 19 and 20. The encryption/decryption module 23 encrypts the fifth data using a common key included in a record of the thin client information 29B corresponding to the thin client terminal 1. Then, the control module 21 transmits the encrypted fifth data to the thin client terminal 1 through the transmission control module 27.

Note that, the setting information 71 may include a file name of the BIOS setting kitting file 72 instead of the BIOS setting kitting file 72 itself. In that case, the thin client terminal 1 can download the BIOS setting kitting file 72 from the download site 216 of the management server 2, by using the file name and a download server URL included in the setting information 71.

With the above-described configuration, the management server 2 can distribute setting information 71 (to be newly set) to the proper thin client terminal 1 registered with the management server 2, by using the thin client information 29B and the group information 29C that are updated in accordance with the operation by the manager using the management console 5.

Now, a functional configuration of the thin client terminal 1 will be explained.

As shown in FIG. 14, the thin client terminal 1 includes an encryption/decryption module 13, a network processing module 14, an information storage area 16, a transmission data generation module 18, and a reception data analysis module 19. The network processing module 14 includes a transmission control module 141 that transmits data to an external device such as the management server 2, a reception control module 142 that receives data from the external device, and a reception wait timer 143 that waits the reception of data from the external device. The transmission control module 141 and the reception control module 142 communicate with the external device through a communication method based on HTTP or HTTPS, for example.

The information storage area 16 is, for example, a specific rewritable memory area in BIOS-ROM 104. In the information storage area 16, a production number 161, a setting information update date and time 162, and setting information 163 may be stored. The production number 161 is identification information that uniquely identifies the thin client terminal 1. The setting information 163 includes various information related to the operation of the thin client terminal 1.

After the thin client terminal 1 is subjected to the setup process, the setting information 163 includes, for example, one or more items of information (parameters) obtained by analyzing first data for setup received from the management server 2 and written. The setting information update date and time 162 indicates a date and time of when the management server 2 creates the first data for setup.

When the thin client terminal 1 is subjected to the setup process and then the setting information 163 is further updated, the setting information 163 includes, for example, at least one or more items of information obtained by analyzing updated data received from the management server 2 and written. The update date and time 162 indicates a date and time of when the management server 2 creates the updated data.

Hereinafter, operations of each component in the thin client terminal that has been subjected to the setup process will be exemplified. Note that, the same operations are performed when the thin client terminal 1 is subjected to the setup process and then the setting information 163 is further updated.

The thin client terminal 1 performs, in response to turning on thereof, a boot authentication process with the management server 2. In the boot authentication process, the management server 2 determines whether a thin client terminal 1 is a proper thin client terminal. In the boot authentication process, as to a proper thin client terminal 1, the setting information 163 stored in the information storage area 16 may be updated.

The network processing module 14 connects the thin client terminal 1 to a network in response to the turning on of the thin client terminal 1. For example, the transmission control module 141 requests the DHCP server 3 to assign an IP address, and the reception control module 142 receives an IP address assigned by the DHCP server 3. The network processing module 14 connects the thin client terminal 1 to the network using the received IP address.

The transmission data generation module 18 generates second data to request the management server 2 to transmit an update date and time of setting information in response to the turning on of the thin client terminal 1. The second data includes, for example, a production number 161 read from the information storage area 16 and an acquisition request of the update date and time of the setting information.

The encryption/decryption module 13 encrypts the generated second data using a common key (with the management server 2) included in the setting information 163. The common key is, for example, received from the management server 2 in the setup. Furthermore, the encryption method may be, for example, AES256.

The transmission control module 141 transmits the encrypted second data to the management server 2. The transmission control module 141 may start the reception wait timer 143 in response to this transmission. The reception wait timer 143 sets a first time to detect a timeout while the thin client terminal 1 waits for reception of third data transmitted from the management server 2 (that is, third data including an update date and time of setting information). When the reception wait timer 143 has detected a timeout while waiting for the reception of the third data, the thin client terminal 1 stops the update process of the setting information 163 and performs a normal boot process.

The reception control module 142 receives the third data including the update date and time of setting information from the management server 2. The reception control module 142 may stop the reception wait timer 143 in response to this reception.

The encryption/decryption module 13 decrypts the third data. The encryption/decryption module 13 sends the decrypted third data to the reception data analysis module 19.

The reception data analysis module 19 reads the setting information update date and time 162 from the information storage area 16, and compares the read setting information update date and time 162 with the update date and time included in the decrypted third data. When the read setting information update date and time 162 differs from the update date and time included in the decrypted third data, the reception data analysis module 19 requests the transmission data generation module 18 to generate fourth data to request the management server 2 to transmit setting information.

The transmission data generation module 18 generates fourth data in accordance with the request by the reception data analysis module 19. The fourth data includes, for example, the production number 161 read from the information storage area 16 and an acquisition request of setting information.

The encryption/decryption module 13 encrypts the generated fourth data using the common key with the management server 2. The transmission control module 141 transmits the encrypted fourth data to the management server 2. The transmission control module 141 may start the reception wait timer 143 in response to this transmission. The reception wait timer 143 sets a second time to detect a timeout while the thin client terminal 1 waits for reception of fifth data transmitted from the management server 2 (that is, fifth data including setting information). When the reception wait timer 143 has detected a timeout while waiting for the reception of the fifth data, the thin client terminal 1 stops the update process of the setting information 163 and performs a normal boot process.

The reception control module 142 receives the fifth data including the setting information 71 from the management server 2. The reception control module 142 may stop the reception wait timer 143 in response to this reception.

The encryption/decryption module 13 decrypts the fifth data. The encryption/decryption module 13 sends the decrypted fifth data to the reception data analysis module 19.

The reception data analysis module 19 analyzes the setting information 71 included in the decrypted fifth data, and acquires data corresponding to items. The reception data analysis module 19 updates the setting information 163 stored in the information storage area 16 using the acquired data. That is, the reception data analysis module 19 updates the setting information 163 by replacing data of an item in the stored setting information 163 with the acquired data of the item. The reception data analysis module 19 also updates the setting information update date and time 162 by replacing the update date and time in the setting information update date and time 162 with the update date and time included in the setting information 71.

The setting information 71 in the decrypted fifth data may include a file. In that case, the reception data analysis module 19 updates the setting information 163 by analyzing the file. The file is, for example, a BIOS setting kitting file 72. The reception data analysis module 19 updates data of BIOS setting included in the setting information 163 in the information storage area 16, by using data obtained by analyzing the BIOS setting kitting file 72 included in the setting information 71.

The thin client terminal 1 is rebooted in response to the update of the setting information 163 by the reception data analysis module 19 using the data of all items obtained from the decrypted fifth data. With this reboot, the thin client terminal 1 operates using the updated setting information 163. That is, the updated setting information 163 can be reflected upon the operation of the thin client terminal 1.

Through the above process, since setting information of each thin client terminal 1 and each group is distributed to each thin client terminal 1 managed by the management server 2, the setting information changed in the management server 2 can be reflected upon the thin client terminal 1. The manager can manage multiple thin client terminals 1 altogether using the management server 2 and the management console 5. Thus, a workload required for the management can be reduced, and the security of the managed thin client terminal 1 can be improved.

Note that, the first data for setup transmitted from the management server 2 to the thin client terminal 1 may include the BIOS setting kitting file 72. In that case, the setup of the thin client terminal 1 can be performed using the information obtained from the analysis of the BIOS setting kitting file 72.

With reference to the flowchart of FIG. 21, an example of the procedure of an update control process executed by the thin client terminal 1 will be explained.

Firstly, the thin client terminal 1 is connected to a network in response to turning on and starting boot thereof (step S61). The thin client terminal 1 is connected to the network using, for example, an IP address leased by the DHCP server 3.

Then, the thin client terminal 1 executes an acquisition process of update date and time to acquire a date and time of when setting information of the thin client terminal 1 is updated in the management server 2 (step S62). The thin client terminal 1 executing the acquisition process of update date and time receives third data including the update date and time from the management server 2. The acquisition process of update date and time will be explained later with reference to FIG. 22.

Then, the thin client terminal 1 reads the setting information update date and time 162 stored in the information storage area 16 (step S63). The thin client terminal 1 determines whether the update date and time in the third data matches with the read setting information update date and time 162 (step S64). When the update date and time in the third data matches with the read setting information update date and time 162 (YES in step S64), the thin client terminal 1 is booted normally since the setting information is not updated in the management server 2 and there is no need of updating the setting information in the thin client terminal 1.

On the other hand, when the update date and time in the third data differs from the read setting information update date and time 162 (NO in step S64), the thin client terminal 1 executes an update process to update the setting information set to the thin client terminal 1 using the setting information distributed from the management server 2 (step S65) and is rebooted. The update process will be explained later with reference to FIG. 23.

Figure 22:
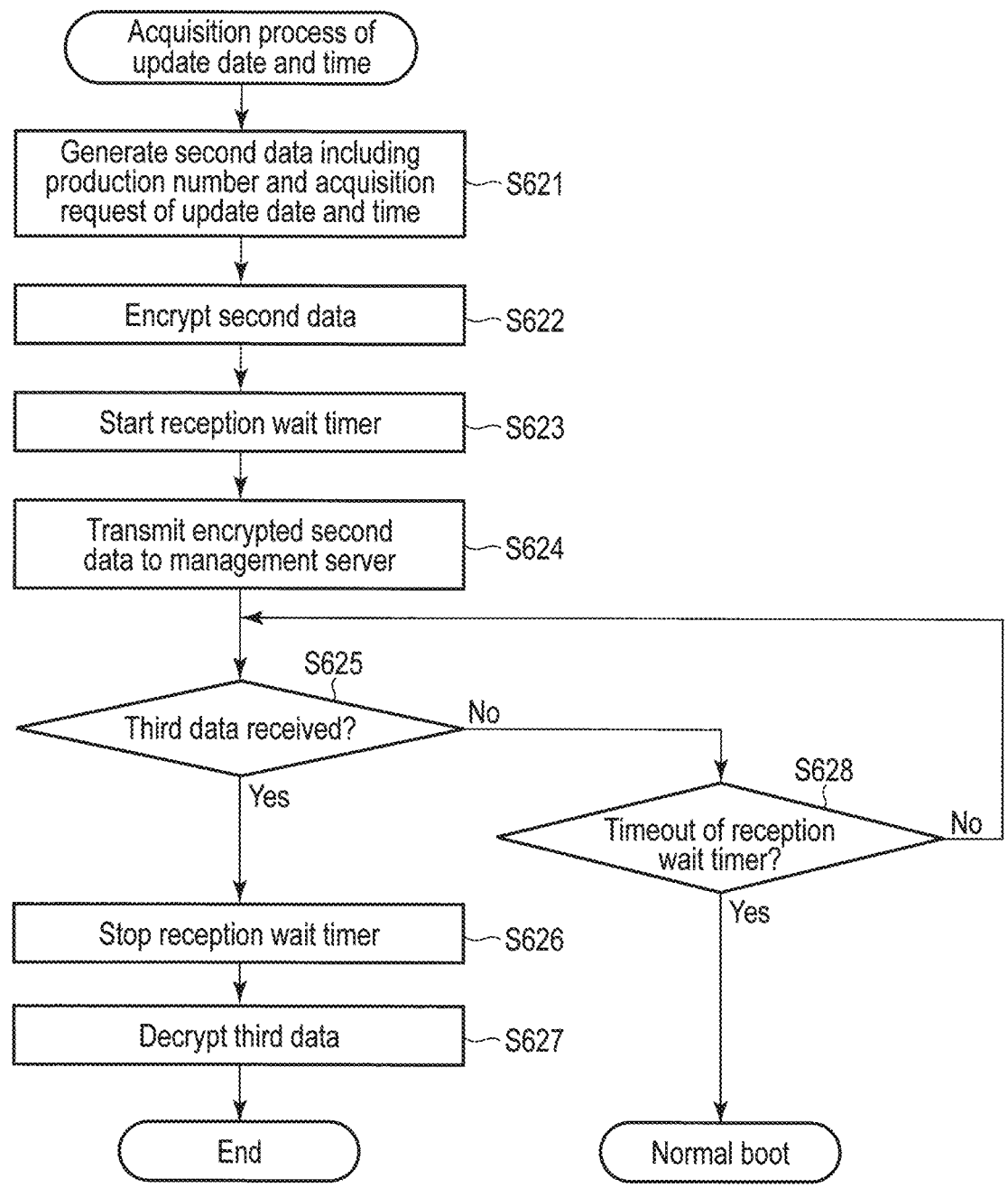
FIG. 22 is a flowchart showing an example of the procedure of an acquisition process of update date and time in the update control process of FIG. 21.

FIG. 22 shows a flowchart of an example of the procedure of the acquisition process of update date and time executed by the thin client terminal 1. The acquisition process of update date and time corresponds to step S62 described above with reference to FIG. 21.

Firstly, the thin client terminal 1 reads a production number 161 from the information storage area 16, and generates second data including the production number 161 and the acquisition request of update date and time (step S621). The thin client terminal 1 encrypts the second data using a common key (step S622). The common key is included in, for example, the setting information 163 stored in the information storage area 16.

The thin client terminal 1 starts the reception wait timer 143 (step S623) and transmits the encrypted second data to the management server 2 (step S624). The reception wait timer 143 sets a first time to detect a timeout while the thin client terminal 1 waits for reception of third data transmitted from the management server 2.

Then, the thin client terminal 1 determines whether the third data has been received from the management server 2 (step S625). When the third data has not been received from the management server 2 (NO in step S625), the thin client terminal 1 determines whether the reception wait timer 143 has detected a timeout (step S628). That is, the thin client terminal 1 determines whether the time elapsed from the start of the reception wait timer 143 has exceeded the first time. When the reception wait timer 143 has not detected the timeout (NO in step S628), the process returns to step S625.

When the reception wait timer 143 has detected the timeout (YES in step S628), the thin client terminal 1 is booted normally. Note that, if the update control process including the acquisition process of update date and time is performed during the boot authentication of the thin client terminal 1, the timeout of the reception wait timer 143 indicates that the management server 2 does not respond to the thin client terminal normally. Thus, the thin client terminal 1 that transitions to the normal boot state may be turned off.

On the other hand, when the third data has been received from the management server 2 (YES in step S625), the thin client terminal 1 stops the reception wait timer 143 (step S626) and decrypts the third data using a common key (step S627). Thus, the update date and time of the setting information included in the decrypted third data can be acquired.

FIG. 23 shows a flowchart of an example of the procedure of the update process executed by the thin client terminal 1. The update process corresponds to step S65 described above with reference to FIG. 21.

Firstly, the thin client terminal 1 reads a production number 161 from the information storage area 16, and generates fourth data including the production number 161 and an acquisition request of setting information (step S651). The production number 161 may be temporarily stored in the main memory 103. The thin client terminal 1 encrypts the fourth data using a common key (step S652).

The thin client terminal 1 starts the reception wait timer 143 (step S653) and transmits the encrypted fourth data to the management server 2 (step S654). The reception wait timer 143 sets a second time to detect a timeout while the thin client terminal 1 waits for reception of fifth data transmitted from the management server 2.

Then, the thin client terminal 1 determines whether the fifth data has been received from the management server 2 (step S655). When the fifth data has not been received from the management server 2 (NO in step S655), the thin client terminal 1 determines whether the reception wait timer 143 has detected a timeout (step S659). That is, the thin client terminal 1 determines whether the time elapsed from the start of the reception wait timer 143 has exceeded the second time. When the reception wait timer 143 has not detected the timeout (NO in step S659), the process returns to step S655.

When the reception wait timer 143 has detected the timeout (YES in step S659), the thin client terminal 1 is booted normally. Note that, if the update control process including the acquisition process of update date and time is performed during the boot authentication of the thin client terminal 1, a timeout of the reception wait timer 143 indicates that the management server 2 does not respond to the thin client terminal 1 normally. Thus, the thin client terminal 1 that transitions to the normal boot state may be turned off.

On the other hand, when the fifth data has been received from the management server 2 (YES in step S655), the thin client terminal 1 stops the reception wait timer 143 (step S656) and decrypts the fifth data using the common key (step S657). Then, the thin client terminal 1 updates the setting information 163 and the setting information update date and time 162 in the information storage area 16 with the setting information 71 obtained by analyzing the decrypted fifth data (step S658). The contents of the decrypted fifth data, that is, the contents of the setting information 71 is described above with reference to FIG. 19. The thin client terminal 1 updates the setting information update date and time 162 in the information storage area 16 with the update date and time in the setting information 71, and updates the setting information 163 in the information storage area 16 with other items in the setting information 71.

Note that, when data of an item in the setting information 163 in the information storage area 16 and data in the setting information 71 corresponding to the item are the same (that is, the data has not been updated), the data of the item in the setting information 163 may not be updated. Furthermore, when data of an item in the setting information 163 is a file, a file name or a file update date and time of the file is compared to a file name or a file update date and time of a file in the setting information 71 corresponding to the item. When they are different, the file of the item in the setting information 163 is updated with the file of setting information 71. The file may be, for example, a file of a user certificate of LAN security setting, a file of a private key of LAN security setting, or the BIOS setting kitting file 72.

Furthermore, the setting information 71 may include, instead of data of a file, a file name and a file update date and time of the file. In that case, a file name or a file update date and time of a file included in the setting information 163 is compared to a file name or a file update date and time of a corresponding file in the setting information 71. When they are different, the thin client terminal 1 downloads the file for update having the file name indicated in the setting information 71 from the download site 216 of the management server 2. Then, the thin client terminal 1 updates the file in the setting information 163 with the downloaded file.

Through the above process, when updated setting information 71 is present in the management server 2, the updated setting information 71 can be distributed to and reflected upon the authenticated thin client terminal 1.

Figure 24:
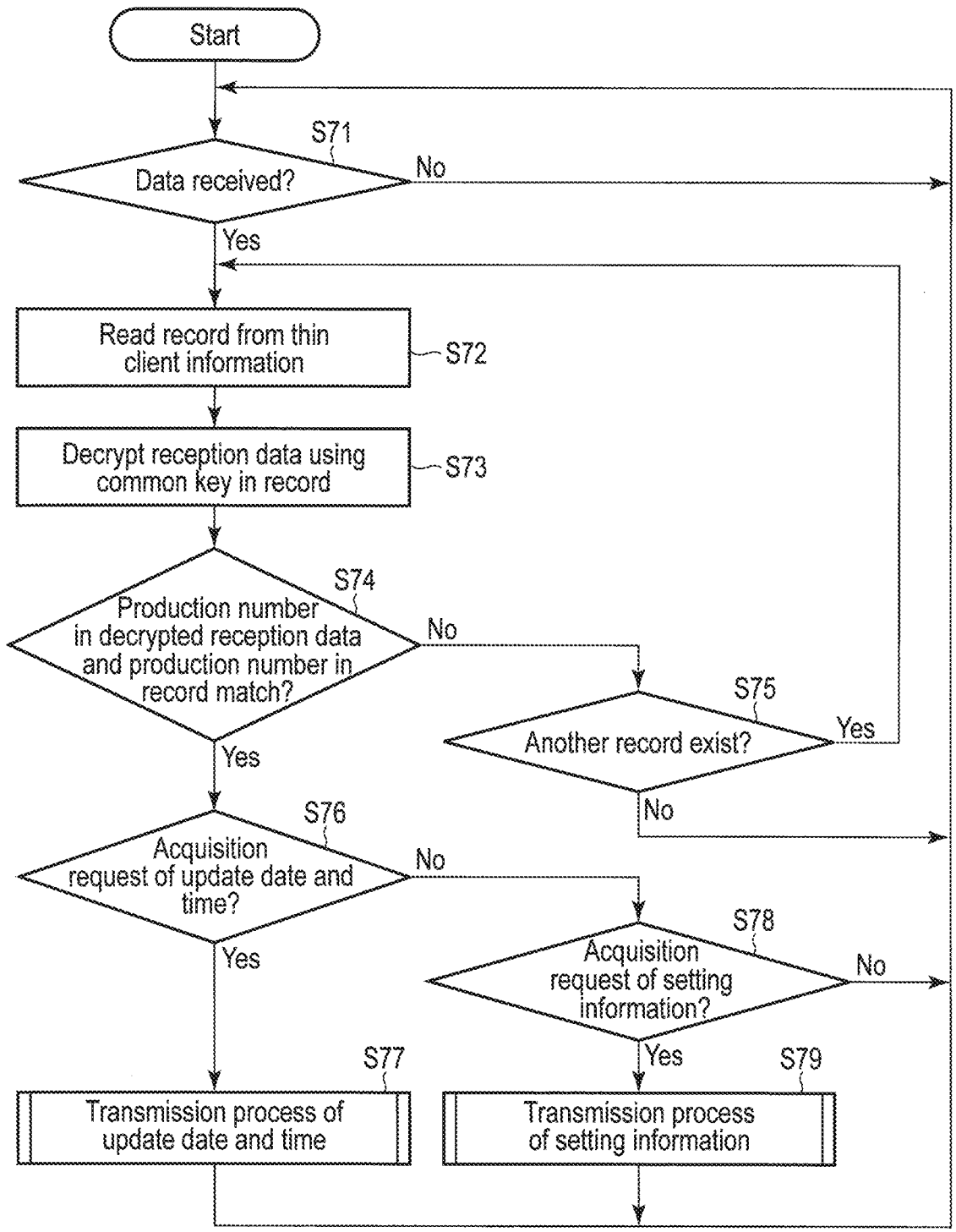
FIG. 24 is a flowchart showing an example of the procedure of a response process executed by the management server in the control system of the second embodiment.

An example of a response process executed by the management server 2 will be explained with reference to FIG. 24.

Firstly, the management server 2 determines whether data has been received (step S71). When the data has not been received (NO in step S71), the process returns to step S71.

On the other hand, when the data has been received (YES in step S71), the management server 2 reads a record from the thin client information 29B (step S72). The management server 2 decrypts the reception data using a common key included in the record (step S73). Then, the management server 2 determines whether a production number included in the decrypted reception data and a production number included in the record match (step S74). That is, whether the terminal transmitting the data to the management server 2 is a thin client terminal 1 registered with the management server 2, is determined.

When the production number in the decrypted reception data is different from the production number in the record (NO in step S74), the management server 2 determines whether the thin client information 29B includes another record that has not been read yet (step S75). When the thin client information 29B includes another record (YES in step S75), the process returns to step S72, and whether the terminal transmitting the data to the management server 2 is a thin client terminal 1 registered with the management server 2 is determined using the another record.

On the other hand, when the thin client information 29B does not include any record to be processed (NO in step S75), the process returns to step S71. That is, the management server 2 determines that the terminal transmitting the data to the management server 2 is a terminal unregistered with the management server 2.

When the production number in the decrypted reception data and the production number in the record match (YES in step S74), that is, when the terminal transmitting the data is a thin client terminal 1 registered with the management server 2, the management server 2 determines whether the decrypted reception data includes an acquisition request of update date and time (step S76). When the decrypted reception data includes the acquisition request of update date and time (YES in step S76), the management server 2 executes a transmission process of update date and time to transmit the update date and time of when the management server 2 updates the setting information to be transmitted to the thin client terminal 1, to the thin client terminal 1 (step S77). The transmission process of update date and time will be explained later with reference to FIG. 25.

On the other hand, when the decrypted reception data does not include the acquisition request of update date and time (NO in step S76), the management server 2 determines whether the decrypted reception data includes an acquisition request of setting information (step S78). When the decrypted reception data includes the acquisition request of setting information (YES in step S78), the management server 2 executes a transmission process of setting information to transmit the setting information to the thin client terminal 1 (step S79). The transmission process of setting information will be explained later with reference to FIG. 26.

Figure 25:
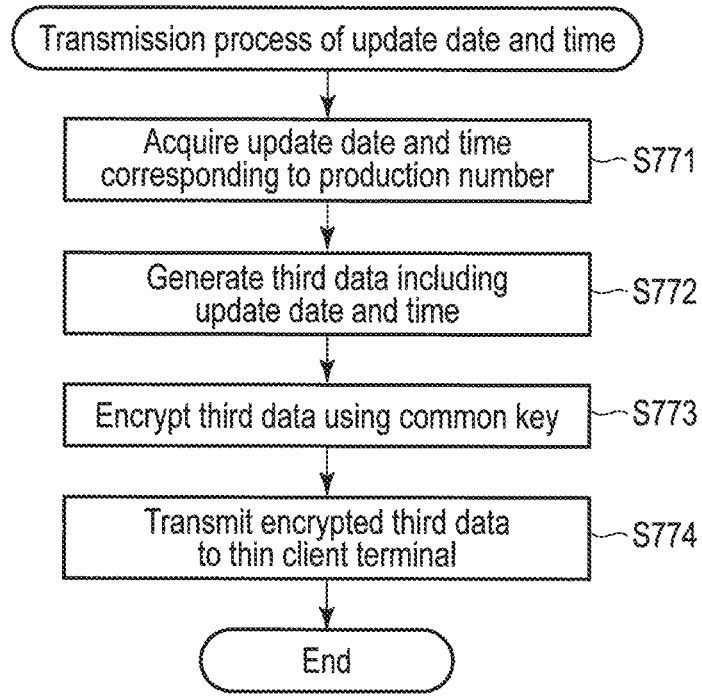
FIG. 25 is a flowchart showing an example of the procedure of a transmission process of update date and time in the response process of FIG. 24.

FIG. 25 shows a flowchart of an example of the procedure of the transmission process of update date and time executed by the management server 2. In the transmission process of update date and time, in accordance with a request by a thin client terminal 1 registered with the management server 2, the update date and time of setting information 71 to be distributed to the thin client terminal 1 is transmitted to the thin client terminal 1. The transmission process of update date and time corresponds to step S77 described above with reference to FIG. 24.

The management server 2 acquires an update date and time corresponding to the production number of the thin client terminal 1 (step S771). The update date and time may be acquired from the thin client information 29B in the database 29, or may be acquired from the record of the thin client information 29B read to determine whether the thin client terminal 1 is a terminal registered with the management server 2 (that is, the record read in step S72 of FIG. 24).

The management server 2 generates third data including the acquired update date and time (step S772). The management server 2 encrypts the third data using a common key (step S773). Then, the management server 2 transmits the encrypted third data to the thin client terminal 1 (step S774).

As described above, the management server 2 can transmit to the thin client terminal 1, the update date and time of the setting information 71 updated by the management server 2 and to be distributed to the thin client terminal 1.

Figure 26:
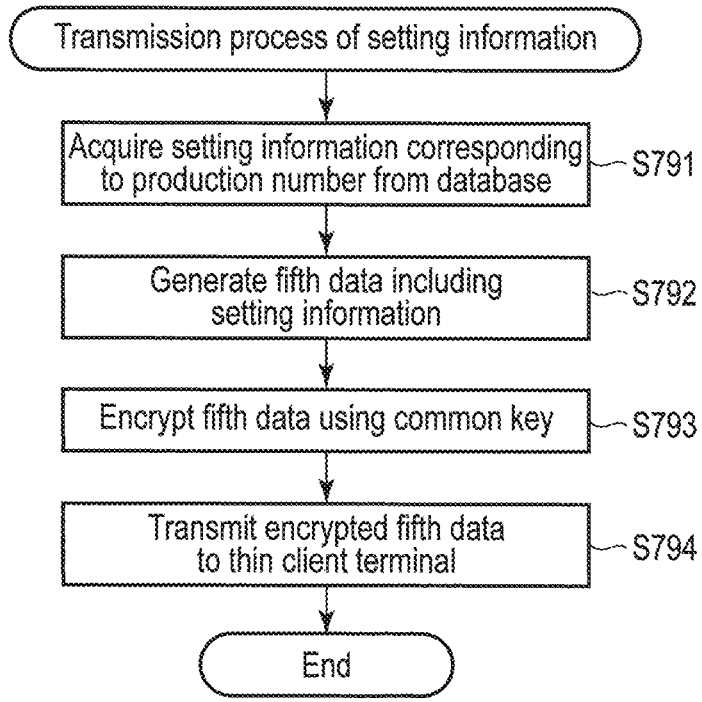
FIG. 26 is a flowchart of an example of the procedure of a transmission process of setting information in the response process of FIG. 24.

FIG. 26 shows a flowchart of an example of the procedure of the transmission process of setting information executed by the management server 2. In the transmission process of setting information, in accordance with a request by a thin client terminal 1 registered with the management server 2, the setting information is distributed to the thin client terminal 1. The transmission process of setting information corresponds to step S79 described above with reference to FIG. 24.

Firstly, the management server 2 acquires the setting information 71 from the database 29, based on the production number of the thin client terminal 1 (step S791). The management server 2 reads, for example, a first record corresponding to the production number of the thin client terminal 1 from the thin client information 29B stored in the database 29. Based on a group name included in the first record, the management server 2 reads a second record from the group information 29C stored in the database 29. The management server 2 generates the setting information 71 using the first and second records.

The management server 2 generates fifth data including the acquired setting information 71 (step S792). The management server 2 encrypts the fifth data using a common key (step S793). Then, the management server 2 transmits the encrypted fifth data to the thin client terminal 1 (step S794).

As described above, the management server 2 can transmit the setting information 71 to the thin client terminal 1.

As can be understood from the above, according to the present embodiment, setting information can easily be updated. A thin client terminal 1 stores setting information 163 and a setting information update date and time 162 that are included in first data transmitted from a management server 2, into an information storage area 16. The setting information update date and time indicates a first date and time of when the management server 2 generates the setting information 163. The first data is, for example, data for setup. When the thin client terminal 1 is booted after the setting information 163 and the setting information update date and time 162 are stored into the information storage area 16, the thin client terminal 1 transmits second data to the management server 2. The second data includes a transmission request of a second date and time of when the management server 2 updates the setting information. When the second data is received from the thin client terminal 1, the management server 2 transmits third data including the second date and time to the thin client terminal 1.

Then, the thin client terminal 1 receives the third data from the management server 2. When the second date and time included in the third data is different from the first date and time indicated by the setting information update date and time 162, the thin client terminal 1 transmits fourth data including a transmission request of updated setting information to the management server 2. When the fourth data is received from the thin client terminal 1, the management server 2 transmits fifth data including updated setting information 163 to the thin client terminal 1.

The thin client terminal 1 receives the fifth data from the management server 2, updates the setting information 163 stored in the information storage area 16 with the updated setting information included in the fifth data, and updates the setting information update date and time 162 stored in the information storage area 16 with the second date and time. Thus, a manager can easily update the setting information 163 set to the authenticated thin client terminal 1.

Various functions of the above embodiments may be realized by a circuit (process circuit). Examples of the process circuit include a programmed processor such as a central processing unit (CPU). The processor executes each of the functions described above by executing a computer program (instructions) stored in a memory. The processor may be a microprocessor including electric circuits. The examples of the process circuit also include a digital signal processor (DSP), an application specific integrated circuit (ASIC), a microcontroller, a controller, and other electric circuit components. Each component other than the CPU described in the above embodiments may be realized by the process circuit.

Since the processing of the embodiments can be implemented by a computer program, advantages similar to the advantages of the embodiments can easily be obtained by installing the computer program into a computer via a computer-readable storage medium in which the computer program is stored and by merely executing the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control system comprising a client terminal and a server, wherein
   the client terminal:
      stores setting information and a first date and time of when the setting information is generated in the server, into a first memory in the client terminal, the setting information and the first date and time are included in first data transmitted from the server,
      transmits, when the client terminal is booted after the setting information and the first date and time are stored into the first memory, second data to the server, the second data comprising a transmission request of a second date and time of when the setting information is updated in the server,
      transmits, when third data has been received from the server and when the second date and time included in the third data is different from the first date and time, fourth data to the server, the fourth data comprising a transmission request of the updated setting information,
      receives fifth data from the server,
      updates the setting information stored in the first memory with the updated setting information included in the fifth data, and
      updates the first date and time stored in the first memory with the second date and time, and
   the server:
      updates the setting information,
      transmits, when the second data has been received from the client terminal, the third data comprising the second date and time to the client terminal, and
      transmits, when the fourth data has been received from the client terminal, the fifth data comprising the updated setting information to the client terminal, and
      stores first information and second information into a second memory of the server, the first information including pieces of information for first setting items that are set to a plurality of client terminals, respectively, the plurality of client terminals including the client terminal, the second information including pieces of information for second setting items that are set to a plurality of groups, respectively, the plurality of groups including a group to which the client terminal belongs,
   wherein the first setting items and the second setting items include different setting items from each other, and
   wherein the updated setting information in the fifth data is information used for setting of the client terminal registered with the server, and comprises a first value and a second value, the first value being determined based on identification information of the client terminal and the first information, the second value being determined based on the identification information and the second information.

2. The control system of claim 1, wherein
   the fifth data comprises a file for setting BIOS of the client terminal, and
   the client terminal updates the setting information stored in the first memory, by using information obtained by analyzing the file.

3. The control system of claim 2, wherein
   the file comprises information related to setting of at least one of a language, a keyboard, a time zone, or a wireless local area network that are used by the client terminal.

4. The control system of claim 1, further comprising:
   a management console that communicates with the server,
   wherein the server updates at least one of the first information or the second information in accordance with an operation via the management console.

5. The control system of claim 1, wherein
   the first information is first table data including records that include values set as the first setting items,
   the second information is second table data including records that include values set as the second setting items,
   the server:
      acquires a first record, which corresponds to the client terminal, from the first table data by using the identification information, and
      specifies the group to which the client terminal belongs based on the identification information, and acquires a second record, which corresponds to the specified group, from the second table data,
   the first value is included in the first record, and
   the second value is included in the second record.

6. An electronic device comprising:
   a processor that updates, after first data is transmitted to a client terminal, setting information, the first data comprising the setting information and a first date and time of when the setting information is generated; and a transmitter that:
  transmits, when second data has been received from the client terminal, third data to the client terminal, the second data comprising a transmission request of a second date and time of when the setting information is updated, the third data comprising the second date and time, and
  transmits, when fourth data has been received from the client terminal, fifth data to the client terminal, the fourth data comprising a transmission request of the updated setting information, the fifth data comprising the updated setting information; and a memory that stores first information and second information, the first information including pieces of information for first setting items that are set to a plurality of client terminals, respectively, the plurality of client terminals including the client terminal, the second information including pieces of information for second setting items that are set to a plurality of groups, respectively, the plurality of groups including a group to which the client terminal belongs, wherein the first setting items and the second setting items include different setting items from each other, and the updated setting information in the fifth data is information used for setting of the client terminal registered with the server, and comprises a first value and a second value, the first value being determined based on identification information of the client terminal and the first information, and the second value being determined based on the identification information and the second information.

7. The electronic device of claim 6, wherein
the fifth data comprises a file for setting BIOS of the client terminal, and
the file comprises information related to setting of at least one of a language, a keyboard, a time zone, or a wireless local area network that are used by the client terminal.

8. The electronic device of claim 6, wherein
the processor updates at least one of the first information or the second information in accordance with an operation via a management console that communicates with the electronic device.

9. The electronic device of claim 6, wherein
the first information is first table data including records that include values set as the first setting items correspond to the client terminals, respectively,
the second information is second table data including records that include values set as the second setting items,
the processor:
  acquires a first record, which corresponds to the client terminal, from the first table data by using the identification information, and
  specifies the group to which the client terminal belongs based on the identification information, and acquires a second record, which corresponds to the specified group, from the second table data,
the first value is included in the first record, and
the second value is included in the second record.

10. An electronic device comprising:
a memory that stores setting information and a first date and time of when a server generates the setting information, the setting information and the first date and time being included in first data transmitted from the server;

a transmitter that:
  transmits, when a client terminal is booted after the setting information and the first date and time are stored into the memory, second data comprising a transmission request of a second date and time of when the server updates the setting information, and
  transmits, when third data has been received from the server and when the second date and time included in the third data is different from the first date and time, fourth data comprising a transmission request of the updated setting information to the server;

a receiver that receives fifth data from the server; and
a processor that:
  updates the setting information stored in the memory with the updated setting information included in the fifth data, and
  updates the first date and time stored in the memory with the second date and time, wherein the server stores first information and second information into a second memory of the server, the first information including pieces of information for first setting items that are set to a plurality of client terminals, respectively, the plurality of client terminals including the client terminal, the second information including pieces of information for second setting items that are set to a plurality of groups, respectively, the plurality of groups including a group to which the client terminal belongs, the first setting items and the second setting items include different setting items from each other, and the updated setting information in the fifth data is information used for setting of the client terminal registered with the server, and comprises a first value and a second value, the first value being determined based on identification information of the client terminal and the first information, and the second value being determined based on the identification information and the second information.

11. The electronic device of claim 10, wherein
the fifth data comprises a file for setting BIOS of the electronic device, and
the processor updates the setting information stored in the memory, by using information obtained by analyzing the file.

12. The electronic device of claim 11, wherein
the file comprises information related to setting of at least one of a language, a keyboard, a time zone, or a wireless local area network that are used by the electronic device.

13. The electronic device of claim 10, wherein the memory is a memory area in a BIOS-ROM.

14. The electronic device of claim 10, wherein
the first information is first table data including records that include values set as the first setting items,
the second information is second table data including records that include values set as the second setting items,
the server:
  acquires a first record, which corresponds to the client terminal, from the first table data by using the identification information, and
  specifies the group to which the client terminal belongs based on the identification information, and acquires a second record, which corresponds to the specified group, from the second table data, the first value is included in the first record, and the second value is included in the second record.

15. A control method of a system comprising a client terminal and a server, the method comprising:

storing setting information and a first date and time of when the server generates the setting information, into a memory in the client terminal, the setting information and the first date and time being included in first data transmitted from the server;

transmitting, when the client terminal is booted after the setting information and the first date and time are stored into the memory, second data from the client terminal to the server, the second data comprising a transmission request of a second date and time of when the server updates the setting information;

transmitting third data comprising the second date and time from the server to the client terminal;

transmitting, when the second date and time included in the third data is different from the first date and time, fourth data comprising a transmission request of the updated setting information from the client terminal to the server;

transmitting fifth data comprising the updated setting information from the server to the client terminal;

updating the setting information stored in the memory in the client terminal, with the updated setting information included in the fifth data; and updating the first date and time stored in the memory in the client terminal, with the second date and time, wherein the server stores first information and second information into a second memory of the server, the first information including pieces of information for first setting items that are set to a plurality of client terminals, respectively, the plurality of client terminals including the client terminal, the second information including pieces of information for second setting items that are set to a plurality of groups, respectively, the plurality of groups including a group to which the client terminal belongs, the first setting items and the second setting items include different setting items from each other, and the updated setting information in the fifth data is information used for setting of the client terminal registered with the server, and comprises a first value and a second value, the first value being determined based on identification information of the client terminal and the first information, and the second value being determined based on the identification information and the second information.

16. The control method of claim 15, wherein the first information is first table data including records that include values set as the first setting items, the second information is second table data including records that include values set as the second setting items, the control method further comprises:

acquiring a first record, which corresponds to the client terminal, from the first table data by using the identification information, specifying the group to which the client terminal belongs based on the identification information, and acquiring a second record, which corresponds to the specified group, from the second table data, the first value is included in the first record, and the second value is included in the second record.

* * * * *